US012261367B2

(12) United States Patent
Sonoda et al.

(10) Patent No.: US 12,261,367 B2
(45) Date of Patent: Mar. 25, 2025

(54) ANTENNA UNIT AND WINDOW GLASS

(71) Applicants: AGC Inc., Tokyo (JP); AGC GLASS EUROPE, Louvain-la-neuve (BE); AGC FLAT GLASS NORTH AMERICA, INC., Alpharetta, GA (US); AGC Vidros do Brasil Ltda., Sao Paulo (BR)

(72) Inventors: Ryuta Sonoda, Tokyo (JP); Masaki Horie, Tokyo (JP)

(73) Assignees: AGC Inc., Tokyo (JP); AGC GLASS EUROPE, Louvain-la-neuve (BE); AGC FLAT GLASS NORTH AMERICA, INC., Alpharetta, GA (US); AGC Vidros do Brasil Ltda., Sao Paulo (BR)

( * ) Notice: Subject to any disclaimer, the term of this patent is extended or adjusted under 35 U.S.C. 154(b) by 184 days.

(21) Appl. No.: 17/688,948

(22) Filed: Mar. 8, 2022

(65) Prior Publication Data

US 2022/0200156 A1 Jun. 23, 2022

Related U.S. Application Data

(63) Continuation of application No. PCT/JP2020/033784, filed on Sep. 7, 2020.

(30) Foreign Application Priority Data

Sep. 18, 2019 (JP) ................................ 2019-169601

(51) Int. Cl.

| | |
|---|---|
| ***H01Q 21/06*** | (2006.01) |
| ***H01Q 1/12*** | (2006.01) |
| ***H01Q 19/02*** | (2006.01) |

(52) U.S. Cl.
CPC ......... *H01Q 21/065* (2013.01); *H01Q 1/1271* (2013.01); *H01Q 19/021* (2013.01)

(58) Field of Classification Search
None
See application file for complete search history.

(56) References Cited

U.S. PATENT DOCUMENTS

| | | | | |
|---|---|---|---|---|
| 5,497,164 A * | 3/1996 | Croq | .................... | H01Q 19/005 343/846 |
| 6,388,621 B1 * | 5/2002 | Lynch | .................. | H01Q 21/065 343/770 |

(Continued)

FOREIGN PATENT DOCUMENTS

| | | |
|---|---|---|
| JP | 6-196915 A | 7/1994 |
| JP | 09-246852 A | 9/1997 |

(Continued)

*Primary Examiner* — Dameon E Levi
*Assistant Examiner* — Ahn N Ho
(74) *Attorney, Agent, or Firm* — Oblon, McClelland, Maier & Neustadt, L.L.P.

(57) ABSTRACT

An antenna unit to be used by being installed so as to face window glass for a building includes a radiating element, a phase control member situated on an exterior-side with reference to the radiating element and configured to control a phase of an electromagnetic wave radiated from the radiating element, and a conductor situated on an interior-side with reference to the radiating element, wherein the phase control member is a member including a dielectric and a plurality of conductor portions.

12 Claims, 17 Drawing Sheets

(56) References Cited

U.S. PATENT DOCUMENTS

| | | | | |
|---|---|---|---|---|
| 2006/0109178 | A1* | 5/2006 | Takeuchi ............. | H01Q 1/1271 343/700 MS |
| 2008/0129619 | A1* | 6/2008 | Lee ........................ | H01Q 21/26 343/810 |
| 2015/0380816 | A1* | 12/2015 | Tajika ................... | H04W 24/02 370/315 |
| 2016/0172757 | A1* | 6/2016 | Gottl ...................... | H01Q 1/246 343/700 MS |

FOREIGN PATENT DOCUMENTS

| | | | | |
|---|---|---|---|---|
| JP | 2002-171122 | A | | 6/2002 |
| JP | 2002-185243 | A | | 6/2002 |
| JP | 2009-89217 | A | | 4/2009 |
| JP | 2009089217 | A | * | 4/2009 |
| JP | 2018-46440 | A | | 3/2018 |
| WO | WO 2012/153663 | A1 | | 11/2012 |
| WO | WO 2019/107514 | A1 | | 6/2019 |

* cited by examiner

ANTENNA UNIT AND WINDOW GLASS

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2020/033784 filed on Sep. 7, 2020 and designating the U.S., which claims priority to Japanese Patent Application No. 2019-169601 filed on Sep. 18, 2019. The entire contents of the foregoing applications are incorporated herein by reference.

BACKGROUND OF THE INVENTION

1. Field of the Invention

The present disclosure relates to an antenna unit and window glass.

2. Description of the Related Art

Conventionally, there has been known a technique for improving the electromagnetic wave transmission performance by using, as a building finishing material, an electromagnetic wave transparent body having a three-layer structure covering an antenna (for example, see PTL 1).

CITATION LIST

Patent Literature

PTL 1: Japanese Laid-Open Patent Publication No. H6-196915

SUMMARY OF THE INVENTION

Technical Problem

Planar antennas such as microstrip antennas strongly radiate electromagnetic waves in the front direction. However, as illustrated in FIG. 1, when a dielectric (for example, window glass 200) having a relatively high relative permittivity is present in front (forward direction) of a planar antenna 100, the electromagnetic waves are reflected at the interface of the dielectric (the window glass 200), which increases the gains of side lobes other than the main lobe (for example, a grating lobe) of the planar antenna 100. As a result, the main lobe of the planar antenna 100 may decrease. It should be noted that main lobe represents the gain of an electromagnetic wave radiated in a downward direction (for example, a direction of an angle of depression) with reference to the front direction of the planar antenna 100 or the antenna unit, and the grating lobe represents the gain of the electromagnetic wave radiated in an upward direction (for example, a direction of an angle of elevation) with reference to the front direction of the planar antenna 100 or the antenna unit.

The present disclosure provides an antenna unit and window glass having a small grating lobe and a large main lobe, thus having a large gain difference between the main lobe and the grating lobe.

Solution to Problem

The present disclosure provides an antenna unit to be used by being installed so as to face window glass for a building, including:

a radiating element;

a phase control member situated on an exterior-side with reference to the radiating element and configured to control a phase of an electromagnetic wave radiated from the radiating element; and a conductor situated on an interior-side with reference to the radiating element, wherein the phase control member is a member including a dielectric and a plurality of conductor portions.

Effect of Invention

According to the technique of the present disclosure, the radiation direction of the electromagnetic wave radiated from the radiating element can be changed, and accordingly, the gain difference between the main lobe and the grating lobe can be increased.

DETAILED DESCRIPTION OF THE PREFERRED EMBODIMENTS

Figure 1:
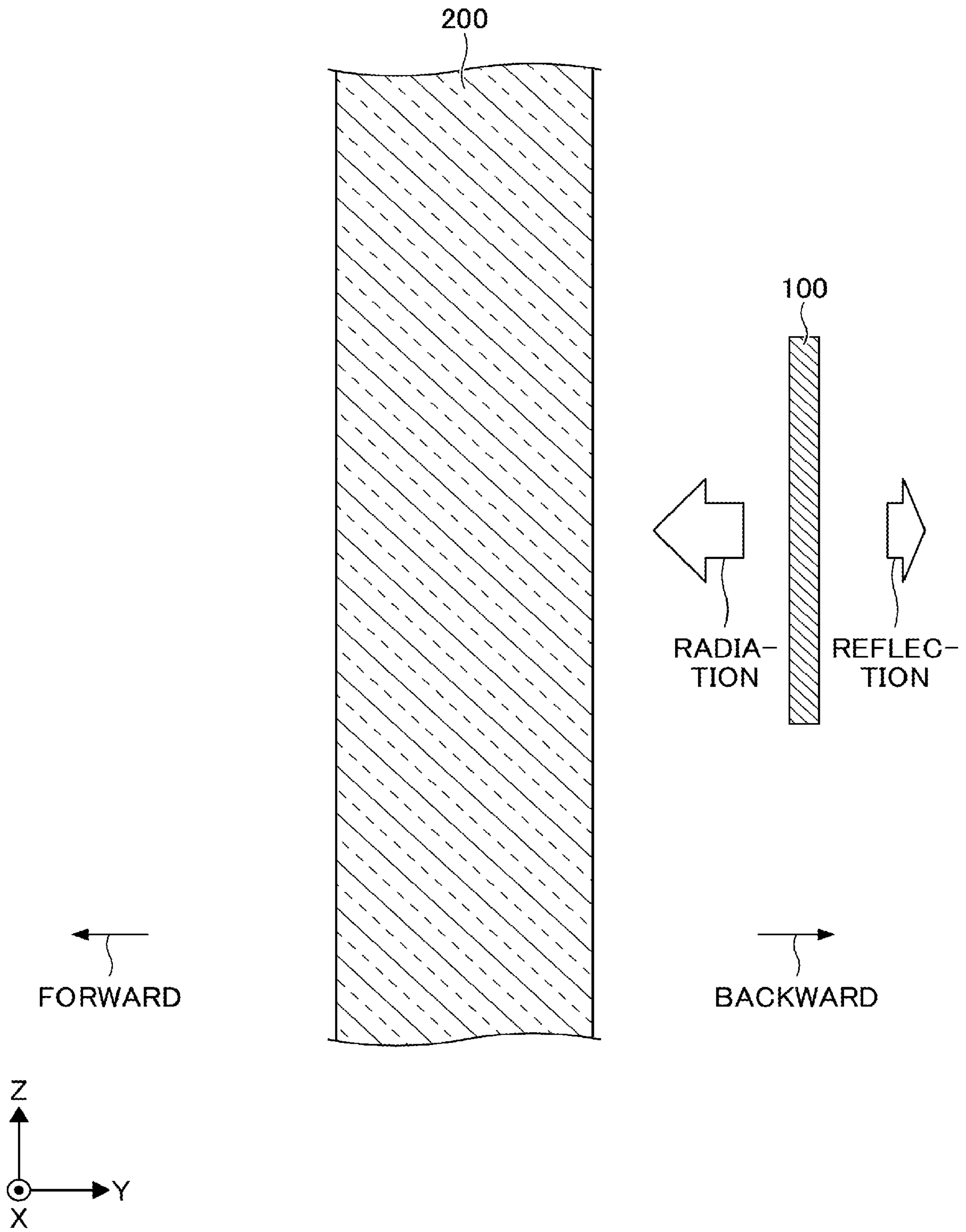
FIG. 1 is a drawing schematically illustrating a case where window glass is present in the forward direction of a planar antenna.

Hereinafter, the embodiment is described with reference to the drawings. For the ease of understanding, the scales of components illustrated in the drawings may differ from the actual scales. In this specification, three-dimensional Cartesian coordinate system constituted by three axial-directions (an X axis direction, a Y axis direction, and a Z axis direction) is used, in which a width direction of a glass plate is defined as an X axis direction, a thickness direction of the glass plate is defined as a Y axis direction, and a height direction of the glass plate is defined as a Z axis direction. A direction extending from the lower side to the upper side of the glass plate is defined as +Z axis direction, and a direction opposite thereto is defined as a −Z axis direction. In the following explanation, the +Z axis direction may be referred to as upward, and the −Z axis direction may be referred to as downward.

The X-axis direction, the Y-axis direction, and the Z-axis direction represent a direction parallel to the X axis, a direction parallel to the Y axis, and a direction parallel to the Z axis, respectively. The X-axis direction, the Y-axis direction, and the Z-axis direction are orthogonal to one another. An XY plane is a virtual plane parallel to the X axis direction and the Y axis direction. A YZ plane is a virtual plane parallel to the Y axis direction and the Z axis direction. A ZX plane is a virtual plane parallel to the Z axis direction and the X axis direction.

Figure 2:
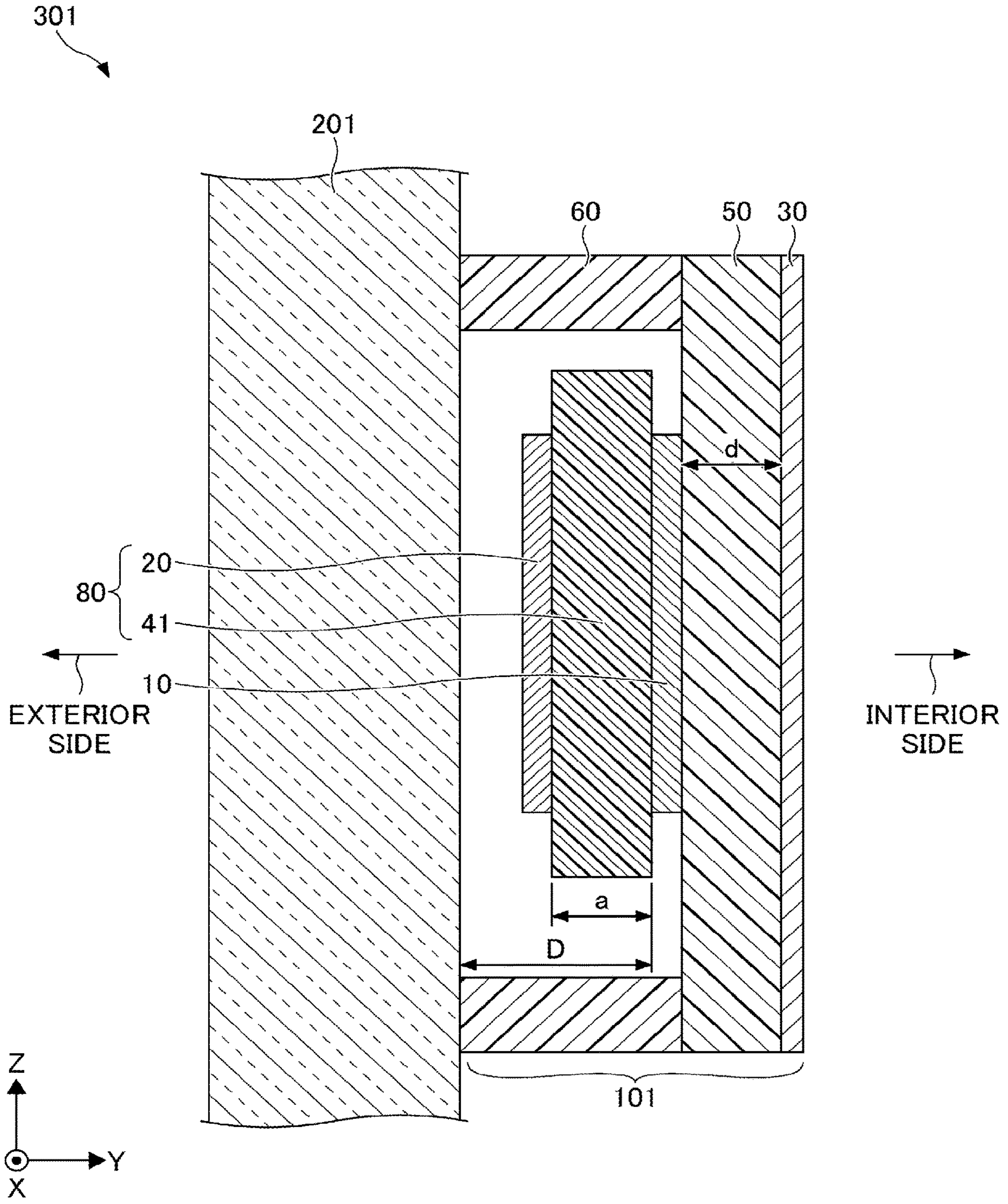
FIG. 2 is a cross sectional view schematically illustrating an example of a laminated structure of an antenna unit-attached window glass according to a first embodiment.

FIG. 2 is a cross sectional view schematically illustrating an example of a laminated structure of an antenna unit-attached window glass according to the first embodiment. An antenna unit-attached window glass 301 as illustrated in FIG. 2 includes an antenna unit 101 and window glass 201. The antenna unit 101 is used as being installed to face an interior-side surface of the window glass 201 for a building.

The window glass 201 is a glass plate used for window of a building or the like. For example, the window glass 201 is formed in a rectangular shape as seen in a plan view in the Y axis direction, and includes a first glass surface and a second glass surface. The thickness of the window glass 201 is set according to the required specifications of a building or the like. In the present embodiment, the first glass surface of the window glass 201 is an exterior-side surface, and the second glass surface is an interior-side surface. In the present embodiment, the first glass surface and the second glass surface may be collectively simply referred to as a principal surface. In the present embodiment, the rectangular shape includes not only a rectangle and a square but also shapes obtained by rounding the corners of a rectangle and a square. The shape of the window glass 201 in a plan view is not limited to the rectangular shape, but may be other shapes such as a circle.

The window glass 201 is not limited to a single plate, and may be laminated glass, insulated glazing, or low-e glass. The low-e glass may also be referred to as low emissivity glass, and may be obtained by coating an interior-side surface of window glass with a coating layer (a transparent conductive film) having a heat ray reflection function. In this case, in order to alleviate a decrease in the electromagnetic wave transmission performance, an opening portion may be provided in the coating layer. The opening portion is preferably provided at a position facing at least a portion of the radiating element 10 and the wave directing member 20. The opening portion may have a patterning. The patterning is, for example, leaving the coating layer in a lattice shape. A portion of the opening portion may have a patterning.

Examples of materials of the window glass 201 include soda-lime-silica glass, borosilicate glass, aluminosilicate glass, or alkali-free glass.

The thickness of the window glass 201 is preferably 1.0 to 20 mm. When the thickness of the window glass 201 is 1.0 mm or more, a sufficient strength for attaching an antenna unit can be provided. Further, when the thickness of the window glass 201 is equal to or less than 20 mm, the electromagnetic wave transmission performance is high. The thickness of the window glass 201 is more preferably 3.0 to 15 mm, and is still more preferably 9.0 to 13 mm.

The antenna unit 101 is a device used by being attached to the interior-side of the window glass 201 for a building, and transmits and receives electromagnetic waves through the window glass 201. For example, the antenna unit 101 is formed to be able to transmit and receive electromagnetic waves in compliance with wireless communication standards such as 5th generation mobile communication systems (commonly referred to as 5G), Bluetooth (registered trademark), and wireless LAN (Local Area Network) standards such as IEEE 802.11ac. The antenna unit 101 may be configured to be able to transmit and receive electromagnetic waves in compliance with standards other than the above, or may be configured to be able to transmit and receive electromagnetic waves in multiple different frequencies. The antenna unit 101 may be used as, for example, a wireless base station used so as to face the window glass 201.

In the embodiment as illustrated in FIG. 2, the antenna unit 101 includes a radiating element 10, a phase control member 80, and a conductor 30.

The radiating element 10 is an antenna conductor formed to be able to transmit and receive electromagnetic waves in a desired frequency band. Examples of desired frequency bands include a UHF (Ultra High Frequency) band with a frequency of 0.3 to 3 GHz, an SHF (Super High Frequency) band with a frequency of 3 to 30 GHz, and an EHF (Extremely High Frequency) band with a frequency of 30 to 300 GHz. The radiating element 10 functions as a radiating device (radiator). The radiating element 10 may be a single antenna element, or may include multiple antenna elements of which the feeding points are different from one another.

The phase control member 80 is provided so as to be situated on the exterior-side with respect to the radiating element 10, and in the illustrated configuration, the phase control member 80 is provided so as to be situated in a specific direction (more specifically, on the negative side in the Y-axis direction) with respect to the radiating element 10. The phase control member 80 according to the present embodiment is provided so as to be situated between the window glass 201 and the radiating element 10. In addition, the wave directing member 20 configured to control the phase of electromagnetic waves to guide electromagnetic waves radiated from the radiating element 10 in a specific direction (the negative side in the Y-axis direction in the illustrated case) is provided. That is, with the phase control member 80, the directivity of the antenna unit 101 can be set in any desired direction.

Figure 8:
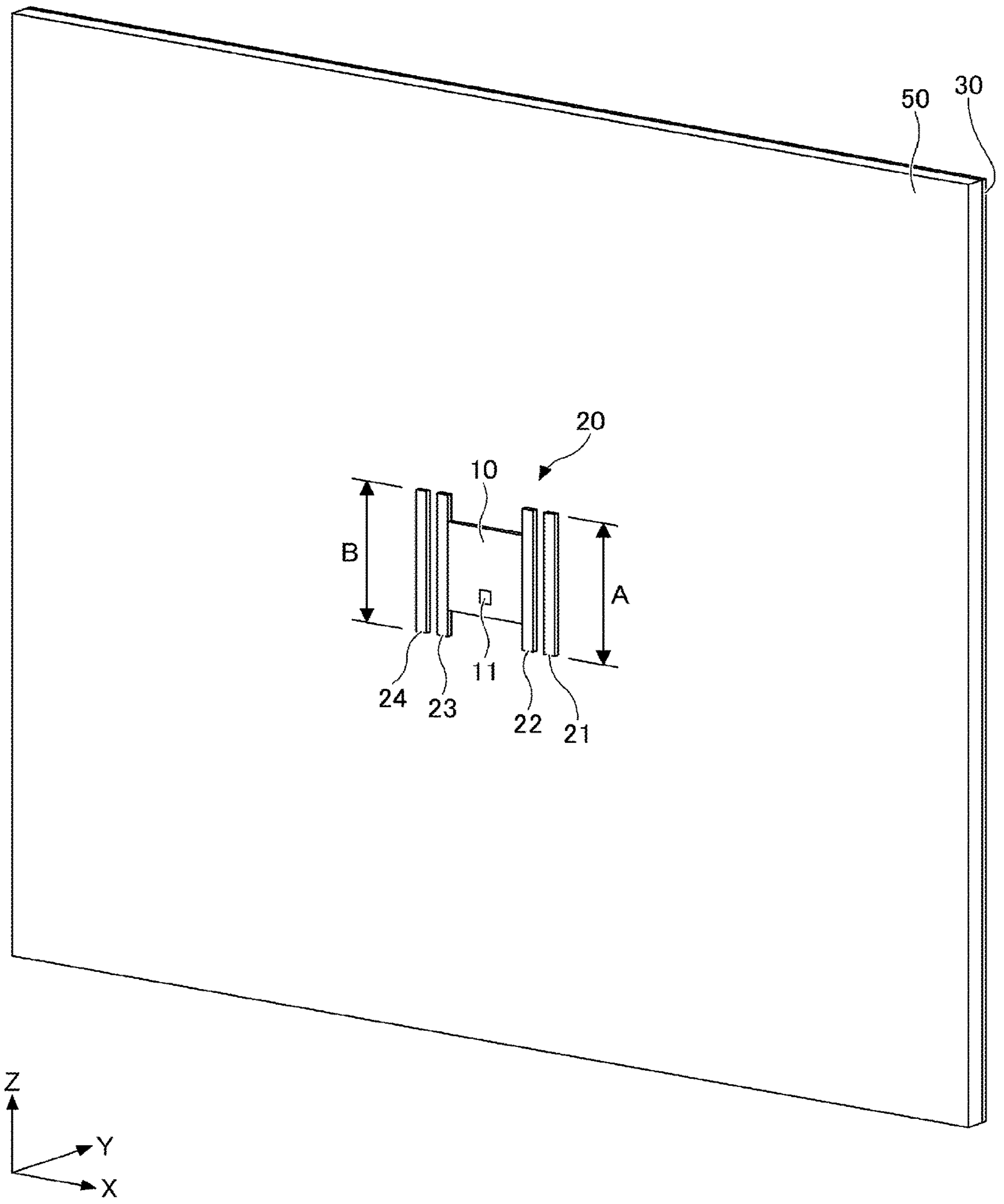
FIG. 8 is a perspective view illustrating a concrete example of configuration of an antenna unit according to the present embodiment.

The phase control member 80 includes a dielectric member 41 and a wave directing member 20. The wave directing member 20 includes multiple conductor portions. FIG. 8 illustrates an example of four conductor portions 21 to 24 (the details of which are explained later).

The conductor 30 is provided on the interior-side with respect to the radiating element 10, and in the configuration as illustrated in FIG. 2, the conductor 30 is provided on the positive side in the Y-axis direction with respect to the radiating element 10.

As explained above, the antenna unit 101 includes the phase control member 80 controlling the phase of electromagnetic wave radiated from the radiating element 10. The phase control member 80 has multiple conductor portions in the wave directing member 20, and accordingly, can control the phase of the electromagnetic wave radiated from the radiating element 10, so that the radiation direction of the electromagnetic wave can be changed. Because the radiation direction of the electromagnetic wave radiated from the radiating element 10 can be changed, a gain difference between the main lobe and the grating lobe (which may be hereinafter simply referred to as a gain difference) of the antenna unit 101 can be increased.

Where a distance between the radiating element 10 and the wave directing member 20 is denoted as a, and a relative permittivity of a medium constituted by a dielectric member 41 between the radiating element 10 and the wave directing member 20 is denoted as $\varepsilon_r$, the distance a is preferably equal to or more than $(2.11\times\varepsilon_r-1.82)$ mm in order to increase the gain difference. The inventors of the present application have found that the gain difference becomes 0 dB or more by setting the distance a as described above. The gain difference being 0 dB or more means that the gain of the main lobe is equal to or more than the gain of the grating lobe. The upper limit of the distance a is not particularly limited, but the distance a may be 100 mm or less, may be 50 mm or less, may be 30 mm or less, may be 20 mm or less, or may be 10 mm or less. Where the wavelength of the operation frequency of the radiating element 10 is denoted as $\lambda_g$, the distance a may be $100\times\lambda_g/85.7$ or less, may be $50\times\lambda_g/85.7$ or less, may be $30\times\lambda_g/85.7$ or less, may be $20\times\lambda_g/85.7$ or less, or may be $10\times\lambda_g/85.7$ or less.

Where the operation frequency of the radiating element 10 is 0.7 to 30 GHz (preferably 1.5 to 6.0 GHz, more preferably 2.5 to 4.5 GHz, still more preferably 3.3 to 3.7 GHz, and particularly preferably 3.5 GHz), the distance a is particularly preferably $(2.11\times\varepsilon_r-1.82)$ mm or more in order to increase the gain difference.

A value obtained by dividing the total size of area S of the multiple conductor portions (the wave directing member 20) by the size of area of the window glass 201 is preferably 0.00001 to 0.001. When the value obtained by dividing the total size of area S of the wave directing member 20 by the size of area of the window glass 201 is 0.00001 or more, the gain difference increases. The value obtained by dividing the total size of area S of the wave directing member 20 by the size of area of the window glass 201 is more preferably 0.00005 or more, still more preferably 0.0001 or more, and particularly preferably 0.0005 or more. When the value obtained by dividing the total size of area S of the wave directing member 20 by the size of area of the window glass 201 is 0.001 or less, the wave directing member 20 is inconspicuous and is aesthetically good. The value obtained by dividing the total size of area S of the wave directing member 20 by the size of area of the window glass 201 is more preferably 0.0008 or less, and still more preferably 0.0007 or less.

The gain difference of equal to or more than 3 dB more greatly alleviates, even when there is an obstacle such as window glass facing the antenna unit, the reflection of the electromagnetic wave caused by the obstacle, which is preferable. The gain difference is more preferably equal to or more than 4 dB and still more preferably equal to or more than 5 dB.

Next, the configuration as illustrated in FIG. 2 is explained in more detail.

The antenna unit 101 includes a radiating element 10, a substrate 50, a conductor 30, a phase control member 80, and a support portion 60. The phase control member 80 includes a wave directing member 20 and a dielectric member 41.

The radiating element 10 is provided on a first principal surface on the exterior-side of the substrate 50. The radiating element 10 may be formed by printing a metal material so that the metal material overlaps at least a portion of a ceramic layer provided on the first principal surface of the substrate 50. Accordingly, the radiating element 10 is provided on the first principal surface of the substrate 50 so as to extend across the portion formed with the ceramic layer and a portion other than the portion formed with the ceramic layer.

For example, the radiating element 10 is a conductor formed in a planar shape. The radiating element 10 is made of a conductive material such as gold, silver, copper, aluminum, chromium, lead, zinc, nickel, or platinum. The conductive material may be an alloy such as, for example, an alloy of copper and zinc (brass), an alloy of silver and copper, an alloy of silver and aluminum, and the like. The radiating element 10 may be a thin film. The shape of the radiating element 10 may be a rectangular or circular shape, but is not limited to these shapes. For example, at least one or more radiating elements 10 are provided so as to be situated between the wave directing member 20 and the conductor 30, and in the illustrated configuration, the radiating element 10 may be formed on a surface of the substrate 50 on the side of the wave directing member 20, the substrate 50 being situated between the wave directing member 20 and the conductor 30. For example, the radiating element 10 is fed at a feeding point with the conductor 30 being the ground reference. For example, a patch element (a patch antenna), a dipole element (a dipole antenna), and the like can be used as the radiating element 10.

Other materials constituting the radiating element 10 include fluorinated tin oxide (FTC), indium tin oxide (ITO), and the like.

The above-described ceramic layer can be formed on the first principal surface of the substrate 50 by printing. When the ceramic layer is provided, wires (not illustrated) attached to the radiating element 10 can be covered, which improves the aesthetics. In the present embodiment, the ceramic layer does not have to be provided on the first principal surface, and may be provided on a second principal surface on the interior-side of the substrate 50. The ceramic layer is preferably provided on the first principal surface of the substrate 50 because the radiating element 10 and the ceramic layer can be formed on the substrate 50 by printing in a same step.

The material of the ceramic layer is glass frit and the like, and the thickness thereof is preferably 1 to 20 μm.

In the present embodiment, the radiating element 10 is provided on the first principal surface of the substrate 50. Alternatively, the radiating element 10 may be provided in the substrate 50. In this case, for example, the radiating element 10 can be provided as a coil form in the substrate 50.

In a case where substrate 50 is laminated glass including a pair of glass plates and a resin layer provided between the pair of glass plates, the radiating element 10 may be provided between the glass plate and the resin layer constituting the laminated glass.

The radiating element 10 may be formed in a planar plate shape. In this case, without using the substrate 50, the radiating element 10 in a planar plate-shape may be directly attached to the support portion 60.

Instead of providing the radiating element 10 on the substrate 50, the radiating element 10 may be provided in the storage container. In this case, for example, the radiating element 10 in a planar plate-shape may be provided in the above-described storage container. The shape of the storage container is not particularly limited, and may be in a rectangular shape. The substrate 50 may be a portion of the storage container.

The radiating element 10 preferably has an optical transparency. The radiating element 10 may have an optical transparency, so that the aesthetics are improved, and the average solar absorptance can be reduced. The visible light transmittance of the radiating element 10 is preferably equal to or more than 40%, and is preferably equal to or more than 60% because the function as window glass can be maintained in terms of transparency. Note that the visible light transmittance can be derived according to JIS R 3106(1998).

The radiating element 10 may be formed in a mesh form to have optical transparency. In this case, "mesh" means a state in which through holes in a form of mesh are formed in the planar surface of the radiating element 10.

When the radiating element 10 is formed in a mesh form, the openings of the mesh may be in a rectangular or rhomboid shape. The line width of the mesh is preferably 5 to 30 μm and more preferably 6 to 15 μm. The line spacing of the mesh is preferably 50 to 500 μm and is more preferably 100 to 300 μm.

The opening rate of the radiating element 10 is preferably equal to or more than 80%, and more preferably equal to or more than 90%. The opening rate of the radiating element 10 is a ratio of the size of area of the opening portions to the total size of area of the radiating element 10 including the opening portions formed in the radiating element 10. The visible light transmittance of the radiating element 10 increases in accordance with an increase in the opening rate of the radiating element 10.

The thickness of the radiating element 10 is preferably equal to or less than 400 nm and more preferably equal to or less than 300 nm. Although the lower limit of the thickness of the radiating element 10 is not particularly limited, the thickness of the radiating element 10 may be equal to or more than 2 nm, may be equal to or more than 10 nm, or may be equal to or more than 30 nm.

When the radiating element 10 is formed in in a mesh form, the thickness of the radiating element 10 may be 2 to 40 μm. When the radiating element 10 is formed in a mesh form, the visible light transmittance can be increased, even if the radiating element 10 is thick.

For example, the substrate 50 is a substrate provided in parallel with the window glass 201. For example, the substrate 50 is formed in the rectangular shape in a plan view, and includes a first principal surface and a second principal surface. The first principal surface of the substrate 50 is provided to face the exterior-side, and in the form as illustrated in FIG. 2, the first principal surface of the substrate 50 is provided to face the second glass surface on the interior-side of the window glass 201. The second principal surface of the substrate 50 is provided to face the interior-side, and in the form as illustrated in FIG. 2, the second principal surface of the substrate 50 is provided to face the same direction as the second glass surface on the interior-side of the window glass 201.

The substrate 50 may be provided with a predetermined angle with reference to the window glass 201. The antenna unit 101 may radiate electromagnetic waves in such a state that (a direction normal to) the substrate 50 on which the radiating element 10 is provided is inclined with reference to (a direction normal to) the window glass 201. This is, for example, a case where the antenna unit 101 is provided at a location, such as window glass or the like of a building, higher than the ground surface, and radiates electromagnetic waves toward the ground surface to form an area on the ground surface. The inclination angle between the substrate 50 and the window glass 201 may be equal to or more than 0 degrees, may be equal to or more than 5 degrees, or may be equal to or more than 10 degrees, because the propagation direction of the electromagnetic waves can be made changed preferably. Also, in order to transmit electromagnetic wave to the outdoors, the inclination angle between the substrate 50 and the window glass 201 may be equal to or less than 50 degrees, may be equal to or less than 30 degrees, or may be equal to or less than 20 degrees.

The material constituting the substrate 50 is designed according to the antenna performance such as the power and directivity required for the radiating element 10, and may be, for example, dielectric such as glass and resin, metal, or a complex thereof. The substrate 50 may be constituted by resin or the like to have an optical transparency. When the substrate 50 is constituted by a material having an optical transparency, the scenery as seen through the window glass 201 is less likely to be blocked by the substrate 50.

In a case where glass is used as the substrate 50, examples of materials of the substrate 50 include soda-lime-silica glass, borosilicate glass, aluminosilicate glass, or alkali-free glass.

The glass plate used as the substrate 50 can be manufactured by a conventional manufacturing process such as float process, fusion process, redraw process, press forming process, Fourcault process, or the like. As the method for manufacturing the glass plate, it is preferable to use the float process, because it is advantageous in productivity and cost.

In the plan view, the glass plate is formed in a rectangular shape. For example, the method for cutting the glass plate may be a method for cutting the glass plate by emitting laser light onto the surface of the glass plate and moving the emission area of the laser light on the surface of the glass plate, or a mechanical cutting method with a cuter wheel or the like.

In the present embodiment, the rectangular shape includes not only a rectangle and a square but also shapes obtained by rounding the corners of a rectangle and a square. The shape of the glass plate in a plan view is not limited to the rectangular shape, but may be other shapes such as a circle. The glass plate is not limited to a single plate, and may be laminated glass or insulated glazing.

In a case where resin is used as the substrate 50, the resin is preferably transparent resin, and may be liquid crystal polymer (LCP), polyimide (PI), polyphenylene ether (PPE), polycarbonate, acrylic resin, fluorine resin, or the like. Fluorine resin is preferable because it has a low dielectric constant.

Fluorine resins include ethylene-tetrafluoroethylene-based copolymer (which may be hereinafter also referred to as "ETFE"), hexafluoropropylene-tetrafluoroethylene-based copolymer (which may be hereinafter also referred to as "FEP"), tetrafluoroethylene-propylene copolymer, tetrafluoroethylene-hexafluoropropylene-propylene copolymer, perfluoro (alkyl vinyl ether)-tetrafluoroethylene-based copolymer (which may be hereinafter also referred to as "PFA"), tetrafluoroethylene-hexa fluoropropylene-vinylidene fluoride System copolymer (which may be hereinafter also referred to as "THV"), polyvinylidene fluoride (which may be hereinafter also referred to as "PVDF"), vinylidene fluoride-hexafluoropropylene-based copolymer, polyvinyl fluoride, chlorotrifluoroethylene-based polymer, ethylene-chlorotrifluoroethylene-based copolymer (which may be hereinafter also referred to as "ECTFE") or polytetrafluoroethylene, or the like. Any one of the above fluorine resins may be used alone, or two or more of the above fluorine resins may be used in combination.

The fluorine resin is preferably at least one selected from the group comprising ETFE, FEP, PFA, PVDF, ECTFE, and THV. ETFE is particularly preferable because ETFE has a high transparency, workability, and weather resistance.

Further, as the fluorine resin, "Fluon ETFE FILM" (registered trademark "AFLEX" in Japan) may be used. A thickness d of the substrate 50 is preferably 25 μm to 10 mm. The thickness d of the substrate 50 can be designed as desired according to the location where the radiating element 10 is provided. Where the thickness of the substrate 50 (or a distance between the radiating element 10 and the conductor 30) is denoted as d, and a wavelength of the operation frequency of the radiating element 10 is denoted as λg, the thickness d is preferably equal to or less than λg/4, in order to increase the gain difference.

In a case where the substrate 50 is resin, the resin is preferably formed in a film or sheet shape. The thickness of the film or the sheet is preferably 25 to 1000 μm, more preferably 100 to 800 μm, and particularly preferably 100 to 500 μm, in order to achieve a high strength for holding the antenna.

In a case where the substrate 50 is glass, the thickness of the substrate 50 is preferably 1.0 to 10 mm, in order to achieve a high strength for holding the antenna.

An arithmetic mean roughness Ra on the first principal surface on the exterior-side of the substrate 50 is preferably equal to or less than 1.2 μm. This is because, when the arithmetic mean roughness Ra of the first principal surface is equal to or less than 1.2 μm, air is likely to flow in a space formed between the substrate 50 and the window glass 201. The arithmetic mean roughness Ra of the first principal surface is more preferably equal to or less than 0.6 μm and still more preferably equal to or less than 0.3 μm. The lower limit of the arithmetic mean roughness Ra is not particularly limited, and, for example, equal to or more than 0.001 μm.

The arithmetic mean roughness Ra can be measured based on Japanese Industrial Standards (JIS) B0601:2001.

The size of area of the substrate 50 is preferably 0.01 to 4 $m^2$. When the size of area of the substrate 50 is equal to or more than 0.01 $m^2$, the radiating element 10, the conductor 30, and the like can be formed without difficulty. When the size of area of the substrate 50 is equal to or less than 4 $m^2$, the antenna unit is inconspicuous and aesthetically good. The size of area of the substrate 50 is more preferably 0.05 to 2 $m^2$.

The antenna unit 101 may have the conductor 30 provided on the second principal surface of the substrate 50 on the opposite side from the window glass 201. The conductor 30 is provided on the interior-side with respect to the radiating element 10, but the conductor 30 does not have to provided. The conductor 30 may be a portion that functions as an electromagnetic shielding layer capable of reducing the electromagnetic waves interference with electromagnetic waves radiated from the radiating element 10 and electromagnetic waves that occur from indoor electronic devices. The conductor 30 may be constituted by a single layer, or may be constituted by multiple layers. The conductor 30 may be constituted by a conventional material, and may be constituted by, for example, a metal film such as copper and tungsten, a transparent substrate using a transparent conductive film, or the like.

The transparent conductive film may be constituted by, for example, indium tin oxide (ITO), fluorinated tin oxide (FTC)), indium zinc oxide (IZO), indium tin oxide including silicon oxide (ITSO), zinc oxide (ZnO), or a conductive material with translucency, such as Si compounds containing phosphorous (P) and boron (B).

The conductor 30 is, for example, a conductor plane formed in a planar shape. The shape of the conductor 30 may be a rectangular shape or a circular shape, but is not limited to these shapes. For example, at least one or more conductors 30 are provided on the opposite side of the radiating element 10 from the wave directing member 20, and in the illustrated embodiment, formed on a surface of the substrate 50 on the opposite side from a surface of the substrate 50 on the side of the wave directing member 20.

The conductor 30 is preferably formed in a mesh form so as to have an optical transparency. In this case, "mesh" means a state in which through holes in a form of mesh are formed in the planar surface of the conductor 30. When the conductor 30 is formed in a mesh form, the openings of the mesh may be in a rectangular or rhomboid shape. The line width of the mesh is preferably 5 to 30 Tim and more preferably 6 to 15 μm. The line spacing of the mesh is preferably 50 to 500 μm and is more preferably 100 to 300 μm.

The method for forming the conductor 30 may be a conventional method, and may be, for example, a sputtering method, a deposition method, or the like.

The surface resistivity of the conductor 30 is preferably equal to or less than 20 Ω/sq, more preferably equal to or less than 10 Ω/sq, and still more preferably equal to or less than 5 S)/sq. The size of the conductor 30 is preferably equal to or more than the size of the substrate 50. When the conductor 30 is provided on the second principal surface on the interior-side of the substrate 50, transmission of electromagnetic waves to indoors can be alleviated. The surface resistivity of the conductor 30 depends on the thickness, the material, and the opening rate of the conductor 30. The opening rate is a ratio of the size of area of the opening portions to the total size of area of the conductor 30 including the opening portions formed in the conductor 30.

In order to improve the aesthetics, the visible light transmittance of the conductor 30 is preferably equal to or more than 40%, and more preferably equal to or more than 60%. In order to alleviate transmission of electromagnetic waves to indoors, the visible light transmittance of the conductor 30 is preferably equal to or less than 90% and more preferably equal to or less than 80°.

The visible light transmittance increases in accordance with an increase in the opening rate of the conductor 30. The opening rate of the conductor 30 is preferably equal to or more than 80%, and is more preferably equal to or more than 90%. In order to alleviate transmission of electromagnetic waves to indoors, the opening rate of the conductor 30 is preferably equal to or less than 95%.

The thickness of the conductor 30 is preferably equal to or less than 400 nm, and more preferably equal to or less than 300 nm. The lower limit of the thickness of the conductor 30 is not particularly limited, but may be equal to or more than 2 nm, equal to or more than 10 nm, or equal to or more than 30 nm.

When the conductor 30 is formed in a mesh form, the thickness of the conductor 30 may be 2 to 40 μm. When the conductor 30 is formed in a mesh form, the visible light transmittance can be increased, even if the conductor 30 is thick.

The antenna unit 101 according to the present embodiment has a configuration in which the substrate 50 is sandwiched between the radiating element 10 and the conductor 30 so as to form a microstrip antenna, i.e., a type of planar antenna. Alternatively, a plurality of radiating elements 10 may be arranged on the surface of the substrate 50 on the side of the wave directing member 20 so as to form an array antenna.

For example, the wave directing member 20 is a conductor formed in a planar shape. The wave directing member 20 is made of a conductive material such as gold, silver, copper, aluminum, chromium, lead, zinc, nickel, or platinum. The conductive material may be an alloy such as, for example, an alloy of copper and zinc (brass), an alloy of silver and copper, an alloy of silver and aluminum, and the like. For example, the wave directing member 20 may be formed by attaching a conductive material to a glass substrate or a resin substrate. The wave directing member 20 may be a thin film.

Multiple conductor portions used for the wave directing member 20 may be a line-shaped or belt-shaped conductor element, and may be in a straight shape or a curved shape. Also, the plurality of conductor portions may have a rectangular shape or a circular shape.

Multiple conductor portions used for the wave directing member 20 may be formed in a mesh form to have optical transparency. In this case, "mesh" means a state in which through holes in a form of mesh are formed in the planar surface of the conductor portions. The visible light transmittance of multiple conductor portions used for the wave directing member 20 is preferably equal to or more than 40%, and is preferably equal to or more than 60% in order to maintain the function as the window glass in terms of transparency.

When the conductor portions are formed in a mesh form, the openings of the mesh may be in a rectangular or rhomboid shape. When the openings of the mesh are formed in a rectangular shape, the openings of the mesh are preferably in a square shape. When the openings of the mesh are in a square shape, the aesthetics are improved. Alternatively, the openings of the mesh may be in directed self-assembly random shapes. Such random shapes can prevent the forming of a moiré pattern. The line width of the mesh is preferably 5 to 30 μm, and more preferably 6 to 15 μm. The line spacing of the mesh is preferably 50 to 500 μm, and more preferably 100 to 300 μm. Where the wavelength of the operation frequency of the radiating element 10 is denoted as λ, the line spacing of the mesh is preferably equal to or less than 0.5λ, more preferably equal to or less than 0.1λ, and still more preferably equal to or less than 0.01λ. When the line spacing of the mesh is 0.5λ or less, the performance of the antenna is high. Also, the line spacing of the mesh may be 0.001λ or more.

The dielectric member 41 is a medium between the radiating element 10 and the wave directing member 20. In the present embodiment, the wave directing member 20 is provided on the dielectric member 41, and more specifically, the wave directing member 20 is provided on an exterior-side surface of the dielectric member 41. The dielectric member 41 is supported by the substrate 50 in such a manner that the interior-side surface of the dielectric member 41 is in contact with the radiating element 10. For example, the dielectric member 41 is a dielectric substrate having a dielectric as its main component with a relative permittivity of larger than 1 and equal to or less than 15 (preferably 7 or less, more preferably 5 or less, and particularly preferably 2.2 or less). Examples of the dielectric member 41 include fluororesin, COC (cycloolefin copolymer), COP (cycloolefin polymer), PET (polyethylene terephthalate), polyimide, ceramic, sapphire, and a glass substrate. When the dielectric member 41 is formed of a glass substrate, examples of materials of the glass substrate include alkali-free glass, quartz glass, soda lime glass, borosilicate glass, alkali borosilicate glass, and aluminosilicate glass. For example, the relative permittivity is measured by the cavity resonator.

The dielectric member 41 has an optical transparency of transmission of visible light, so that the scenery as seen through the window glass 201 is less likely to be blocked by the dielectric member 41.

The support portion 60 is a portion that supports the antenna unit 101 on the window glass 201. In the present embodiment, the support portion 60 supports the antenna unit 101 so as to form a space between the window glass 201 and the wave directing member 20. The support portion 60 may be a spacer that secures a space between the window glass 201 and the substrate 50 or may be a housing of the antenna unit 101. The support portion 60 is formed by a dielectric substrate. Examples of materials of the support portion 60 include conventional resins such as silicone resin, polysulfide resin, and acrylic resin. Alternatively, a metal such as aluminum may be used.

The distance D between the window glass 201 and the radiating element 10 is preferably 0 to 3λ, where the wavelength at the resonance frequency of the radiating element 10 is denoted as λ. When the distance D between the window glass 201 and the radiating element 10 is 0 to 3λ, the reflection of electromagnetic waves at the glass interface can be alleviated. The distance D between the window glass 201 and the radiating element 10 is more preferably equal to or more than 0.1λ, and still more preferably equal to or more than 0.2λ. The distance D between the window glass 201 and the radiating element 10 is more preferably equal to or less than 2λ, still more preferably equal to or less than A, and particularly preferably equal to or less than 0.6λ.

A value obtained by dividing the total size of area S of multiple conductor portions (the wave directing member 20) by the size of area of the substrate 50 is preferably 0.0001 to 0.01. When the value obtained by dividing the total size of area S of the wave directing member 20 by the size of area of the substrate 50 is equal to or more than 0.0001, the gain difference increases. The value obtained by dividing the total size of area S of the wave directing member 20 by the size of area of the substrate 50 is more preferably equal to or more than 0.0005, still more preferably equal to or more than 0.001, particularly preferably equal to or more than 0.0013. When the value obtained by dividing the total size of area S of the wave directing member 20 by the size of area of the substrate 50 is equal to or less than 0.01, the wave directing member 20 is inconspicuous and is aesthetically good. The value obtained by dividing the total size of area S of the wave directing member 20 by the size of area of the substrate 50 is more preferably equal to or less than 0.005 and still more preferably equal to or less than 0.002.

It should be noted that the wave directing member 20 may be provided so as to be in contact with the interior-side surface of the window glass 201. In this case, the dielectric member 41 may be provided, or does not have to be provided, and the relative permittivity of the medium between the radiating element 10 and the wave directing member 20 is preferably less than the relative permittivity of the window glass 201. The relative permittivity of the window glass 201 may be 10 or less, may be 9 or less, may be 7 or less, or may be 5 or less.

Figure 3:
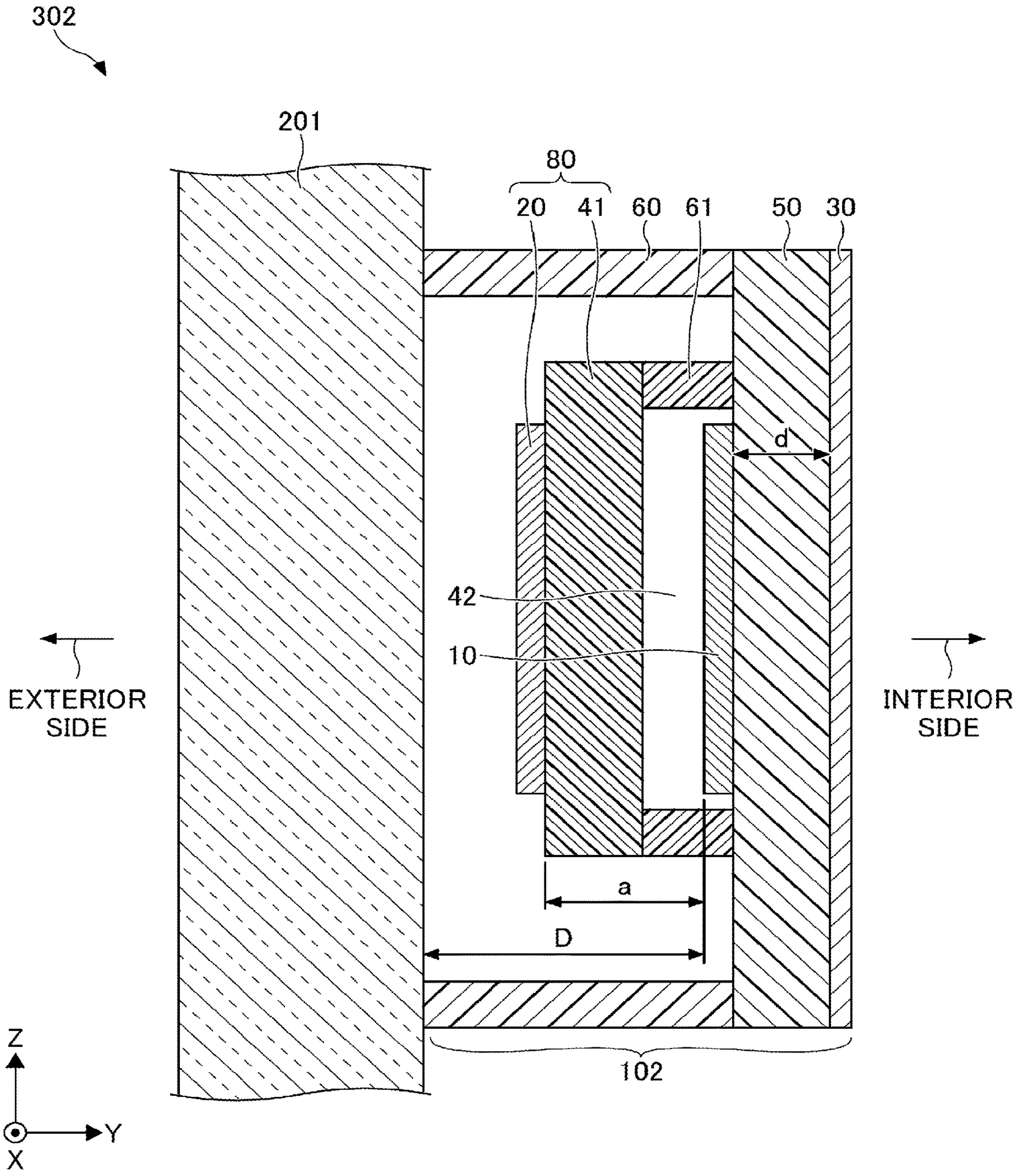
FIG. 3 is a cross sectional view schematically illustrating an example of a laminated structure of an antenna unit-attached window glass according to a second embodiment.

FIG. 3 is a cross sectional view schematically illustrating an example of a laminated structure of an antenna unit-attached window glass according to a second embodiment. Description about the configurations and effects substantially the same as the above embodiment is omitted or simplified by incorporating the above description by reference. An antenna unit-attached window glass 302 includes an antenna unit 102 and a window glass 201. The antenna unit 102 is attached to the interior-side surface of the window glass 201 for a building.

Similar to the above-described embodiment, the antenna unit 102 includes a phase control member 80 provided between the window glass 201 and the radiating element 10, and therefore the gain difference increases.

In the antenna unit 102, a dielectric member 41 is supported by a spacer 61 on a substrate 50, so that the interior-side surface of the dielectric member 41 is not in contact with the radiating element 10. Specifically, the dielectric member 41 is situated so that a space 42 is formed between the radiating element 10 and the dielectric member 41. The medium between the radiating element 10 and the wave directing member 20 includes both of the dielectric member 41 and the space 42. Air is present in the space 42, but gas other than air may be used. The space 42 may be a vacuum. Because the radiating element 10 is not in contact with the dielectric member 41, the resonance frequency is unlikely to be affected by the dielectric member 41, and therefore, the gain difference increases.

Because the dielectric member 41 is situated so that the space 42 is formed between the radiating element 10 and the dielectric member 41, the distance a of the antenna unit 102 is preferably 2.1 mm or more in order to increase the gain difference. The distance a is determined by the effective relative permittivities of the dielectric member 41 and the space 42. The inventors of the present application have found that, when the dielectric member 41 is situated so that the space 42 is formed between the radiating element 10 and the dielectric member 41, the gain difference can attain 0 dB or more when the distance a is set as described above.

Figure 4:
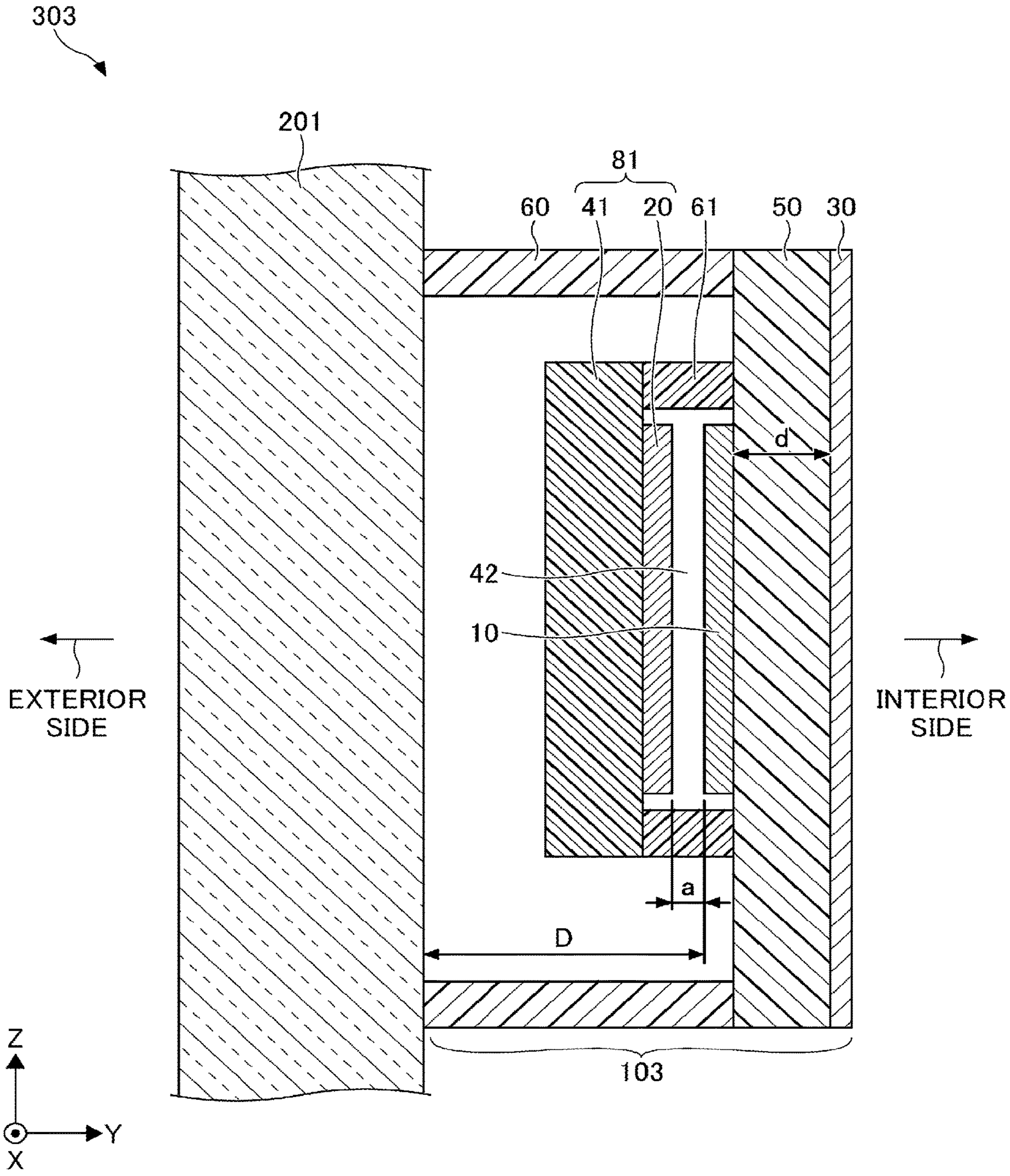
FIG. 4 is a cross sectional view schematically illustrating an example of a laminated structure of an antenna unit-attached window glass according to a third embodiment.

FIG. 4 is a cross sectional view schematically illustrating an example of a laminated structure of an antenna unit-attached window glass according to a third embodiment. Description about the configurations and effects substantially the same as the above embodiment is omitted or simplified by incorporating the above description by reference. An antenna unit-attached window glass 303 includes an antenna unit 103 and window glass 201. The antenna unit 103 is attached to the interior-side surface of the window glass 201 for a building.

Similar to the above-described embodiment, the antenna unit 103 includes a phase control member 81 provided between the window glass 201 and a radiating element 10, and therefore the gain difference increases. The phase control member 81 includes: a wave directing member 20 having multiple conductor portions; and a dielectric member 41 situated on the side of the window glass 201 with reference to the wave directing member 20, and has the same function as the phase control member 80 of the above-described embodiment.

In the antenna unit 103, the dielectric member 41 is supported by a spacer 61 on a substrate 50, so that the wave directing member 20 formed on the interior-side surface of the dielectric member 41 is not in contact with the radiating element 10. In other words, the antenna unit 103 includes the dielectric member 41, i.e., an example of dielectric situated on the opposite side of the wave directing member 20 from the radiating element 10. The wave directing member 20 is situated between the dielectric member 41 and the radiating element 10. The wave directing member 20 provided on the interior-side surface of the dielectric member 41 is situated so that the space 42 is formed between the wave directing member 20 and the radiating element 10, and the medium between the radiating element 10 and the wave directing member 20 includes only the space 42. Air is present in the space 42, but gas other than air may be used. The space 42 may be a vacuum. Because the radiating element 10 is not in contact with the dielectric member 41, and the medium between the radiating element 10 and the wave directing member 20 includes only the space 42, the resonance frequency is unlikely to be affected by the dielectric member 41, and therefore, the gain difference increases.

Because the medium between the radiating element 10 and the wave directing member 20 includes only the space 42, the distance a of the antenna unit 103 is preferably 2.3 mm or more in order to increase the gain difference. The inventors of the present application have found that, when the medium between the radiating element 10 and the wave directing member 20 includes only the space 42, the gain difference can attain 0 dB or more when the distance a is set as described above.

Although the dielectric member 41 is supported on the substrate 50 by the spacer 61, the dielectric member 41 may be supported by the support portion 60. Also, the dielectric member 41 does not have to be provided, and merely space may exist between the wave directing member 20 and the window glass 201. In a case where nothing but space exists between the wave directing member 20 and the window glass 201, the wave directing member 20 is supported by, for example, the support portion 60 or the spacer 61.

Figure 5:
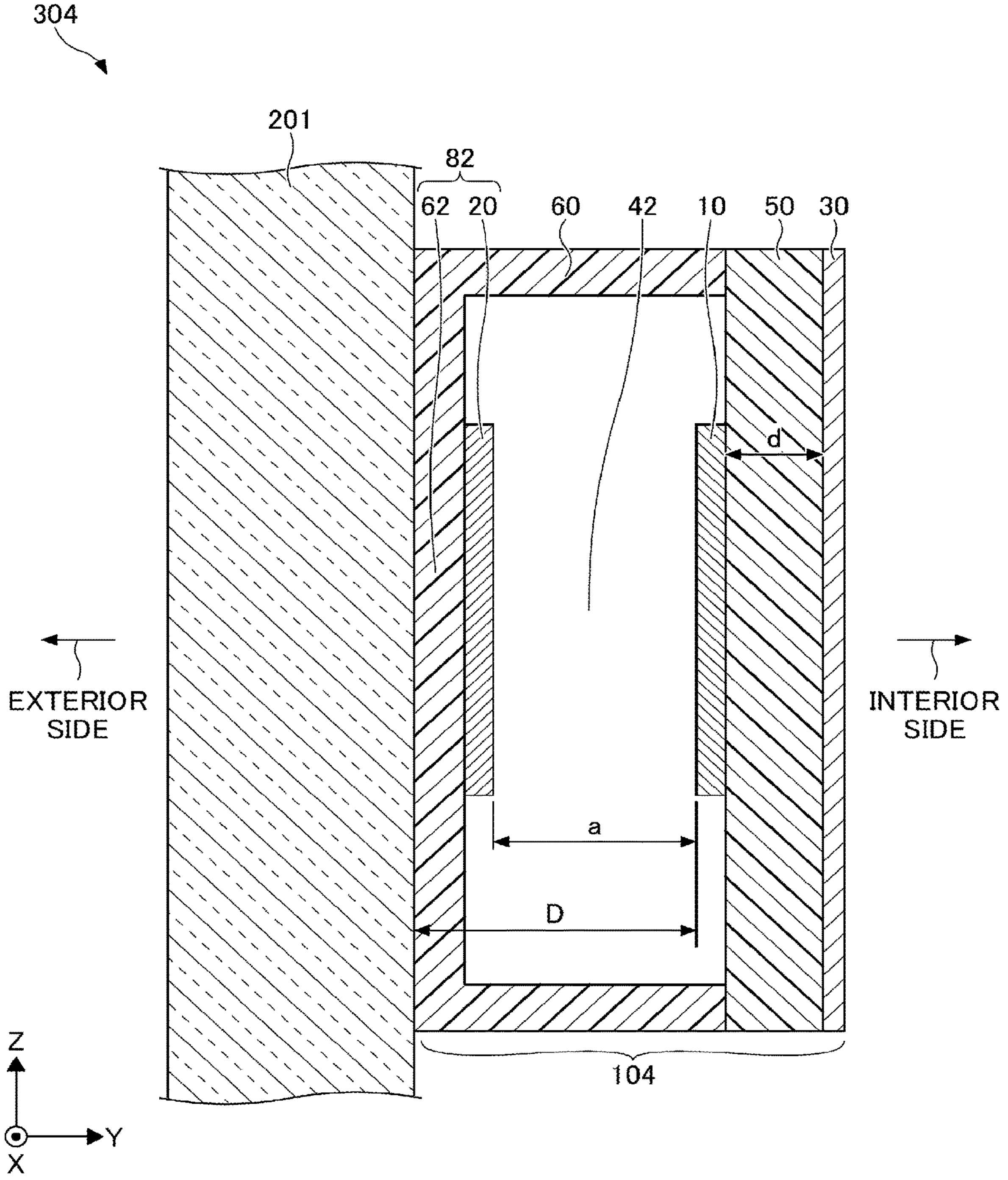
FIG. 5 is a cross sectional view schematically illustrating an example of a laminated structure of an antenna unit-attached window glass according to a fourth embodiment.

FIG. 5 is a cross sectional view schematically illustrating an example of a laminated structure of an antenna unit-attached window glass according to a fourth embodiment. Description about the configurations and effects substantially the same as the above embodiment is omitted or simplified by incorporating the above description by reference. An antenna unit-attached window glass 304 includes an antenna unit 104 and window glass 201. The antenna unit 104 is attached to the interior-side surface of the window glass 201 for a building.

Similar to the above-described embodiment, the antenna unit 104 includes a phase control member 82 provided between the window glass 201 and the radiating element 10, and therefore, the gain difference increases. The phase control member 82 includes: a wave directing member 20 having multiple conductor portions; and a support wall 62 that is a dielectric situated on the side of the window glass 201 with reference to the wave directing member 20, and has the same function as the phase control member 80 of the above-described embodiment.

In the antenna unit 104, the wave directing member 20 is formed on a support wall 62 of a support portion 60 on the side of the window glass 201, the wave directing member 20 being formed on an inner wall surface of the support wall 62 facing the interior-side, so that the wave directing member 20 does not come into contact with the radiating element 10. In other words, the antenna unit 104 includes (the support wall 62 of) the support portion 60, i.e., an example of dielectric situated on the opposite side of the wave directing member 20 from the radiating element 10. The wave directing member 20 is situated between the support wall 62 and the radiating element 10. The wave directing member 20 provided on the support wall 62 of the support portion 60 is situated so that the space 42 is formed between the wave directing member 20 and the radiating element 10, and the medium between the radiating element 10 and the wave directing member 20 includes only the space 42. Air is present in the space 42, but gas other than air may be used. The space 42 may be a vacuum. Because the medium between the radiating element 10 and the wave directing member 20 includes only the space 42, the gain difference increases.

Because the medium between the radiating element 10 and the wave directing member 20 includes only the space 42, the distance a of the antenna unit 104 is preferably 2.3 mm or more in order to increase the gain difference.

Figure 6:
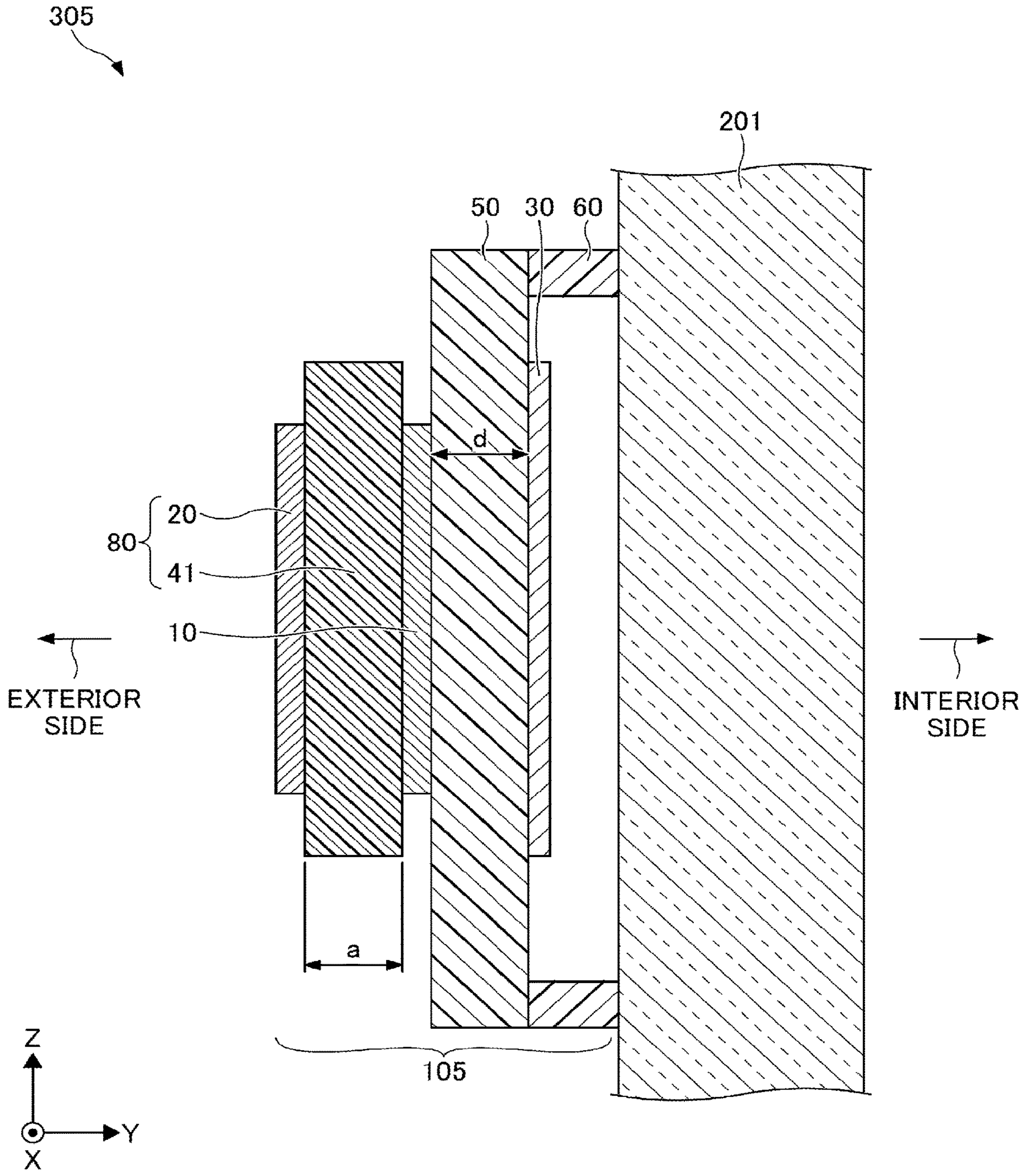
FIG. 6 is a cross sectional view schematically illustrating an example of a laminated structure of an antenna unit-attached window glass according to a fifth embodiment.

FIG. 6 is a cross sectional view schematically illustrating an example of a laminated structure of an antenna unit-attached window glass according to a fifth embodiment. Description about the configurations and effects substantially the same as the above embodiment is omitted or simplified by incorporating the above description by reference. An antenna unit-attached window glass 305 includes an antenna unit 105 and window glass 201. The antenna unit 105 is attached to an exterior-side surface of window glass 201 for a building.

The antenna unit 105 has the same laminated structure as the antenna unit 101 (see FIG. 2). However, the antenna unit 105 is different from the antenna unit 101 in that the radiating element 10 is situated between the window glass 201 and the wave directing member 20.

Because, in the antenna unit 105, the wave directing member 20 is arranged on the opposite side (i.e., the exterior-side) of the radiating element 10 from the window glass 201 situated on the interior-side in this manner, the phase of the electromagnetic waves radiated from the radiating element 10 toward exterior-side can be controlled by the phase control member 80, and the reflection of the electromagnetic waves at the interface of the window glass 201 situated at the interior-side of the radiating element 10 can be reduced, and therefore, the gain difference increases. As a result, the gain of the electromagnetic waves incident in a direction normal to the surface of the window glass 201 increases, and the reflection to the back (interior-side) of the radiating element 10 decreases, so that the gain difference increases. Also, the distance a is preferably ($2.11\times\varepsilon_r-1.82$) mm or more in order to increase the gain difference.

It should be noted that the antenna unit attached to the exterior-side of the window glass 201 is not limited to the antenna unit 105 of FIG. 6. For example, an antenna unit having the same laminated structure as the antenna unit 102 of FIG. 3, the antenna unit 103 of FIG. 4, or the antenna unit 104 of FIG. 5 may be attached to the exterior-side of the window glass 201.

Figure 7:
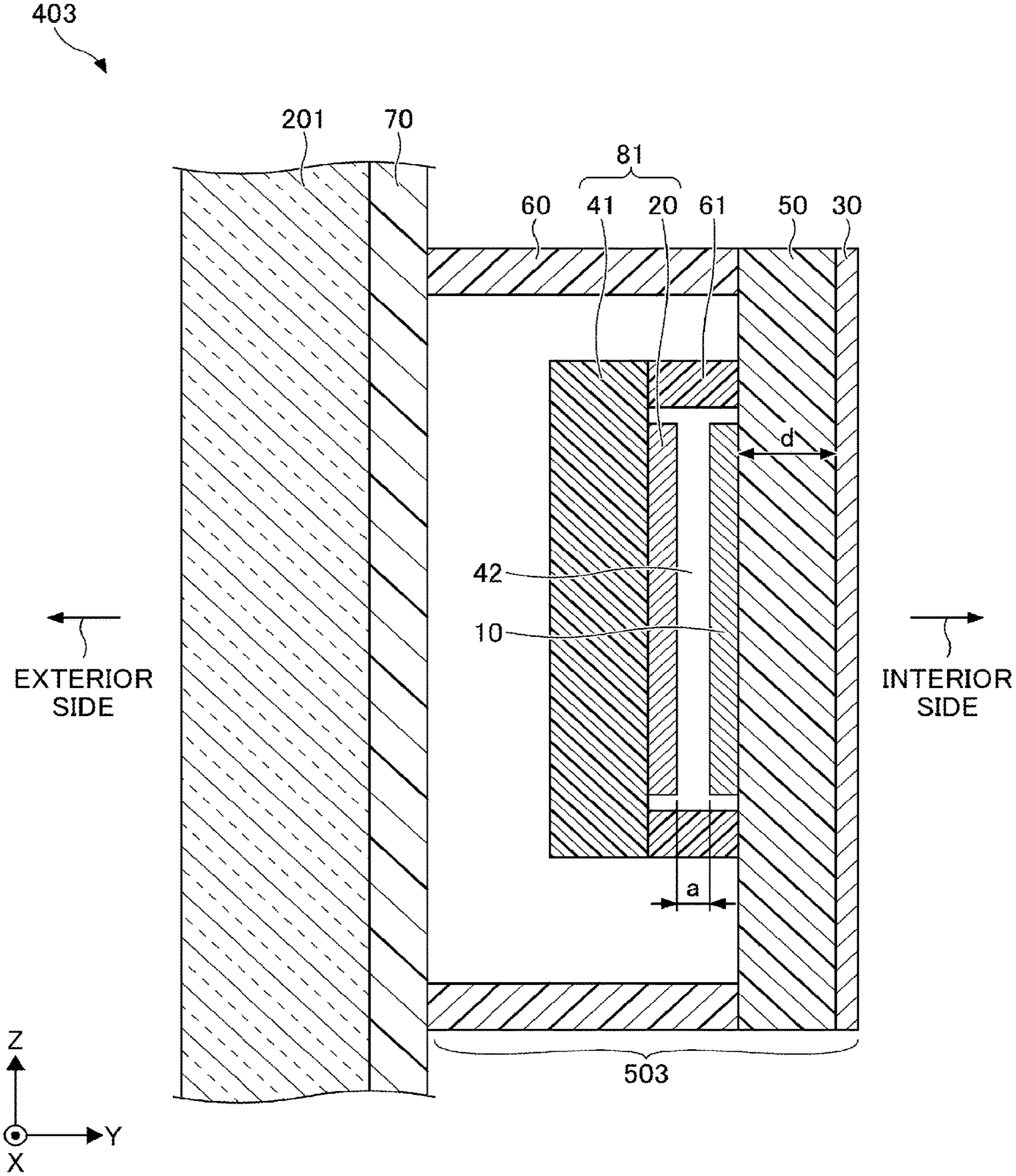
FIG. 7 is a cross sectional view schematically illustrating an example of a laminated structure of an antenna unit-attached window glass according to a sixth embodiment.

FIG. 7 is a cross sectional view schematically illustrating an example of a laminated structure of an antenna unit-attached window glass according to a sixth embodiment. Description about the configurations and effects substantially the same as the above embodiment is omitted or simplified by incorporating the above description by reference. An antenna unit-attached window glass 403 includes an antenna unit 503 and window glass 201. The antenna unit 503 is attached to the interior-side surface of the window glass 201 for a building. The antenna unit 503 has the same laminated structure as the antenna unit 103 (see FIG. 4). Specifically, the antenna unit 503 is used by being attached to the window glass 201 so that a matching member 70 is interposed between the window glass 201 and a wave directing member 20.

The matching member 70 is an example of a matching body for matching the mismatch of the impedance between the window glass 201 and the medium existing between the radiating element 10 and the window glass 201. Because the mismatch of the impedance is adjusted, the electromagnetic waves radiated from the radiating element 10 to the window glass 201 are suppressed from being reflected by the interface of the window glass 201, and therefore, the gain difference increases.

Where the relative permittivity of the window glass 201 is denoted as $\varepsilon_r1$, the relative permittivity of the matching member 70 is denoted as $\varepsilon_r2$, and the relative permittivity of the medium between the matching member 70 and the radiating element 10 is denoted as $\varepsilon_r3$, it is preferable that $\varepsilon_r1$ be larger than $\varepsilon_r2$ and $\varepsilon_r2$ be larger than $\varepsilon_r3$. Accordingly, the electromagnetic waves radiated from the radiating element 10 propagate, with reduction in the reflection loss, through the medium between the matching member 70 and the radiating element 10, through the matching member 70, and then through the window glass 201, and therefore the gain difference increases.

The matching member 70 is provided on the window glass 201. In the present embodiment, the matching member 70 is provided on the interior-side surface of the window glass 201. The antenna unit 503 is attached to the interior-side surface of the window glass 201 via the matching member 70.

The dielectric member 41 is an example of the medium between the matching member 70 and the radiating element 10. In the antenna unit-attached window glass 403, the matching member 70 and the dielectric member 41 are not in contact with each other, but the matching member 70 and the dielectric member 41 may be in contact with each other.

Similar to the above-described embodiment, the distance a is preferably equal to or more than ($2.11\times\varepsilon_r-1.82$) mm in order to increase the gain difference.

It should be noted that the antenna unit attached to the interior-side of the window glass 201 via the matching member 70 is not limited to the antenna unit 503 of FIG. V. For example, the antenna unit having the same laminated structure as the antenna unit 101 of FIG. 2, the antenna unit 102 of FIG. 3, or the antenna unit 104 of FIG. 5 may be attached to the interior-side of the window glass 201 via the matching member 70.

In the antenna unit-attached window glass as illustrated in FIG. 7, a conductor may be provided between the matching member 70 and the window glass 201. When a conductor is provided between the matching member 70 and the window glass 201, the thickness of the matching member 70 can be reduced. For example, the conductor provided between the matching member 70 and the window glass 201 is a conductor pattern having a Frequency Selective Surface (FSS) formed with a mesh or slit pattern and the like to pass electromagnetic waves in a predetermined frequency range. The conductor provided between the matching member 70 and the window glass 201 may be a meta-surface. The conductor does not have to be provided between the matching member 70 and the window glass 201.

FIG. 8 is a perspective view illustrating a specific example of configuration of an antenna unit according to the present embodiment. A radiating element 10 is fed at a feeding point 11. In the form as illustrated in FIG. 8, the wave directing member 20 includes multiple conductor portions 21 to 24 arranged parallel to one another. The number of conductor portions is not limited to four. Multiple conductor portions may be line-shaped or belt-shaped conductor elements, and may be in a straight shape or a curved shape.

In order to increase the gain difference, the shape of each of the conductor portions may be changed, or the relationship in position between the radiating element 10 and each of the conductor portions may be changed. The multiple conductor portions may have the same shape as one another as illustrated in FIG. 8. Among the multiple conductor portions, conductor portions of a first group (in the case of FIG. 8, the conductor portions 21, 22) and conductor portions of a second group (in the case of FIG. 8, the conductor portions 23, 24) may be arranged symmetrically about the radiating element 10 as illustrated in FIG. 8. In the form as illustrated in FIG. 8, the multiple conductor portions 21 to 24 are on the same plane (on the ZX plane), and the lengths of the multiple conductor portions 21 to 24 are the same as one another in the polarization direction (the Z axis direction) of the radiating element 10.

The multiple conductor portions do not have to be on the same plane. The phases of currents induced in the respective conductor portions provided in different planes are different from one another, and therefore, the gain difference increases.

Figure 9:
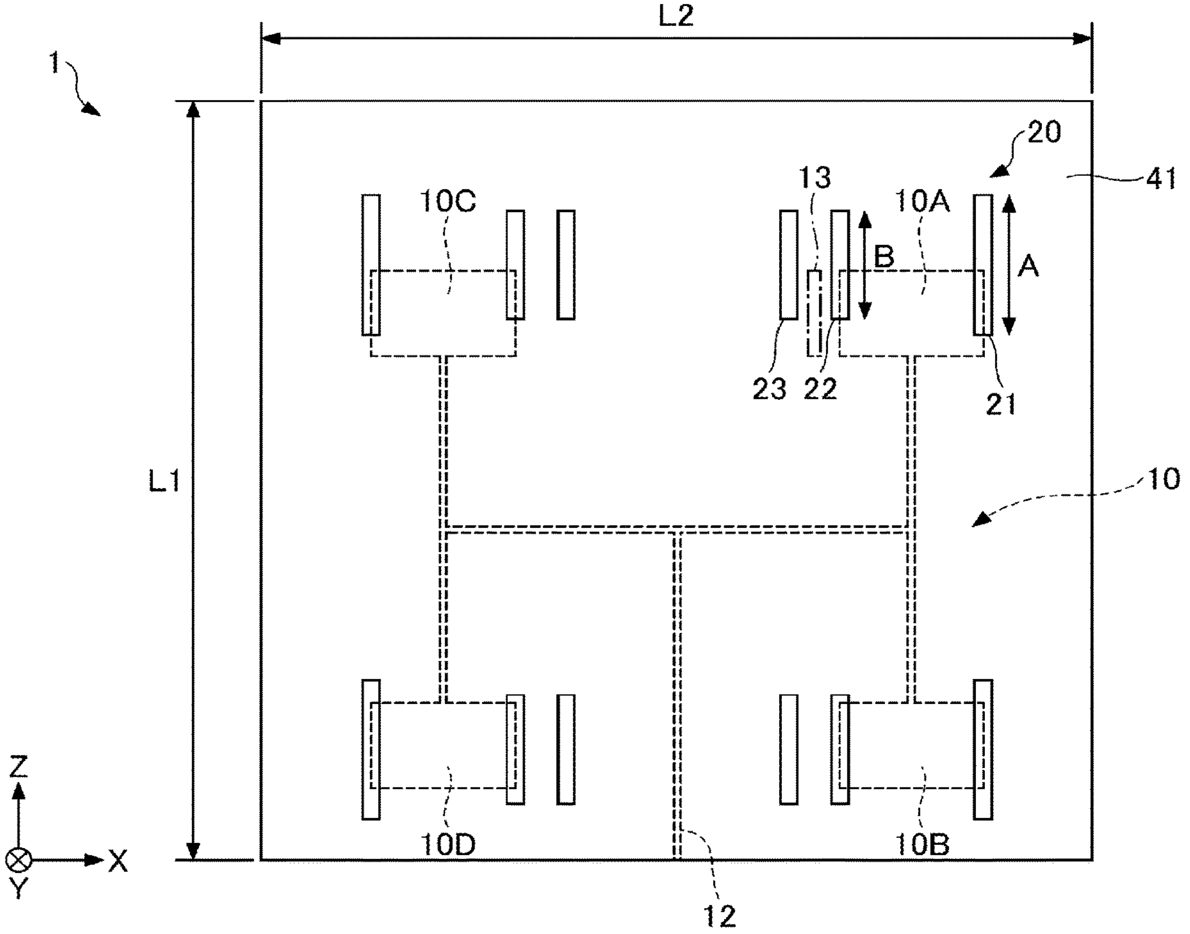
FIG. 9 is a plan view illustrating a specific example of an antenna unit according to the present embodiment.
Figure 10:
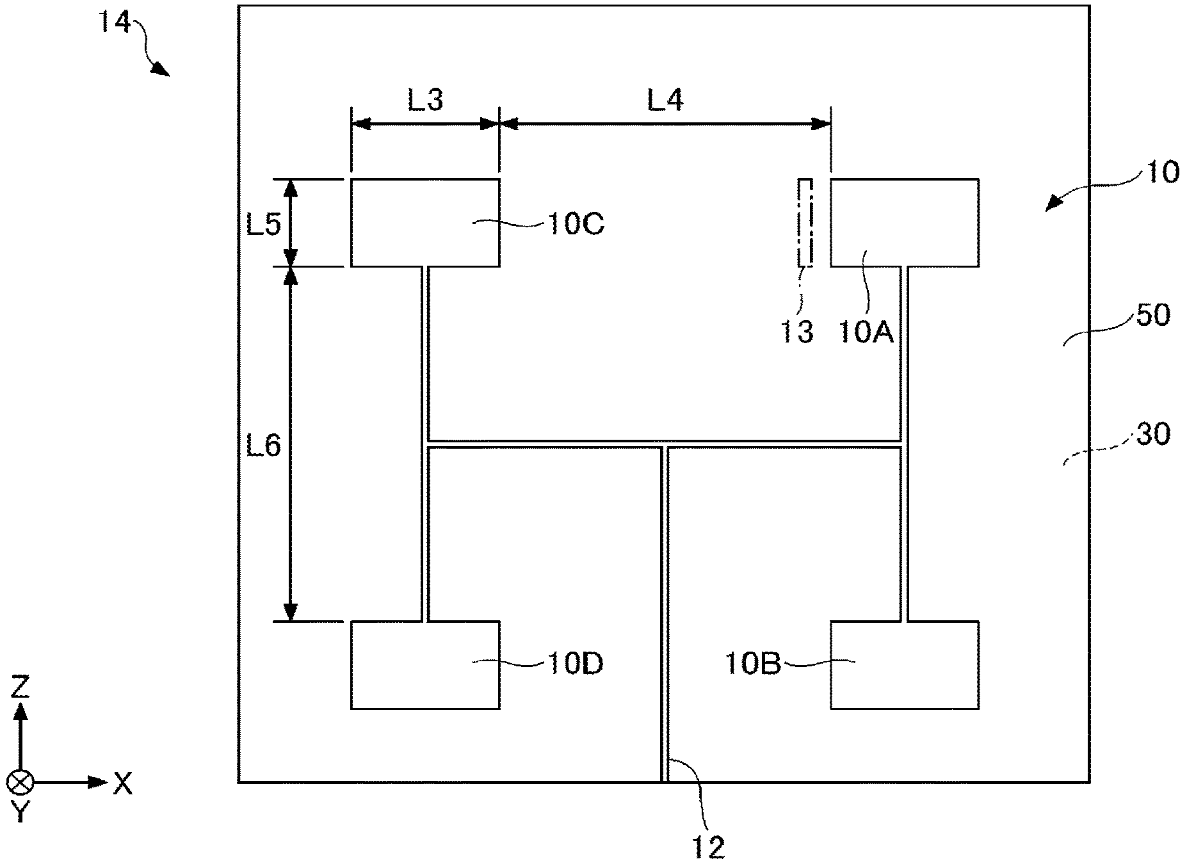
FIG. 10 is a plan view illustrating a configuration of a microstrip array antenna of the antenna unit as illustrated in FIG. 9.
Figure 11:
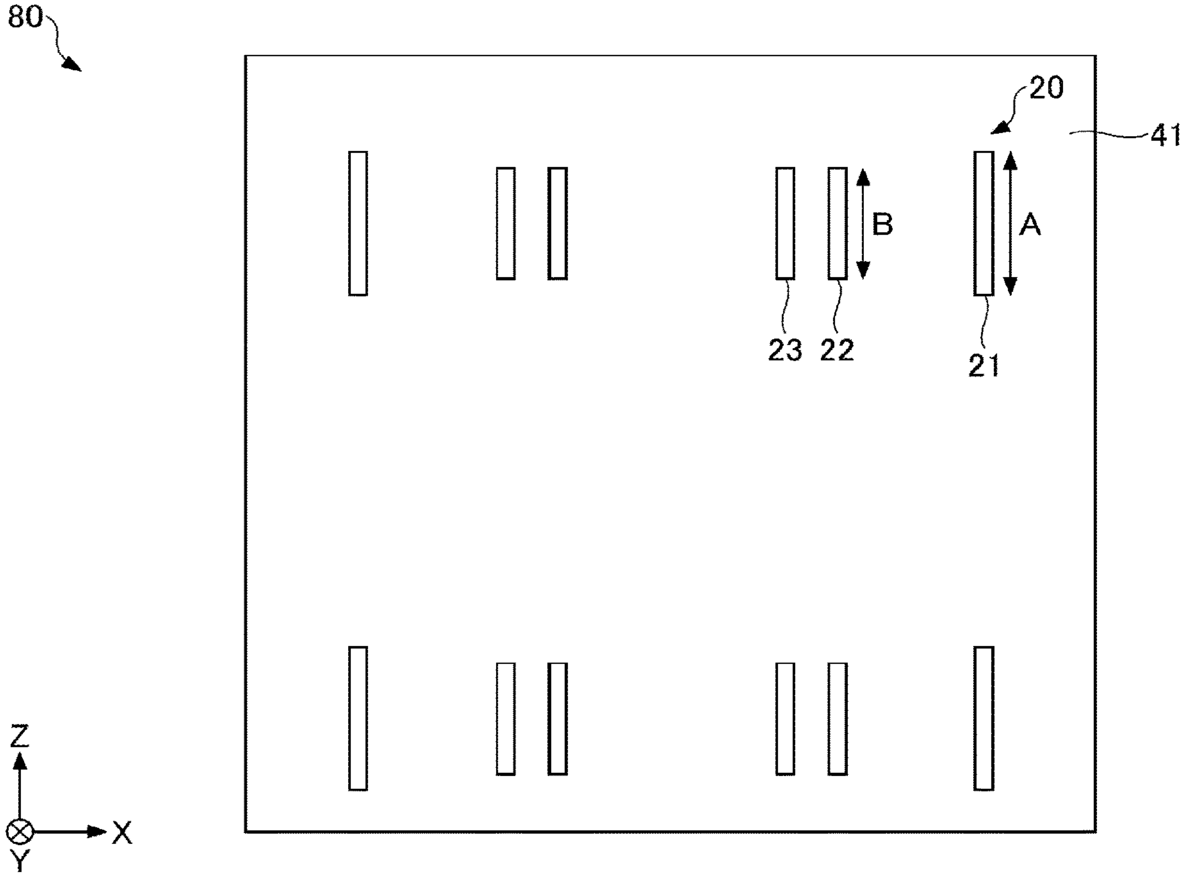
FIG. 11 is a plan view illustrating a configuration of a phase control member of the antenna unit as illustrated in FIG. 9.

FIG. 9 is a plan view illustrating a specific example of an antenna unit according to the present embodiment. FIG. 10 is a plan view illustrating a configuration of a microstrip array antenna of the antenna unit as illustrated in FIG. 9. FIG. 11 is a plan view illustrating a configuration of a phase control member of the antenna unit as illustrated in FIG. 9. In the antenna unit 1 as illustrated in FIG. 9, a microstrip array antenna 14 (FIG. 10) in which the radiating element 10 is constituted by multiple patch elements 10A to 10D and a phase control member 80 (FIG. 11) including multiple conductor portions 21 to 23 provided on the dielectric member 41 are laminated. The laminated structure is the same as in FIG. 3. Multiple patch elements 10A to 10D arranged in an array manner on the substrate 50 are fed by a transmission line 12.

The multiple conductor portions may include conductor portions in different shapes as illustrated in FIG. 9. The phases of currents induced in the respective conductor portions different in shape are different from one another, and accordingly, the gain difference increases. In the case of FIG. 9, the conductor portions 22 and 23 are in the same shape as one another, but the conductor portion 21 is in a shape different from the conductor portions 22 and 23. Among the multiple conductor portions, conductor portions of a first group (in the case of FIG. 9, the conductor portion 21) and conductor portions of a second group (in the case of FIG. 9, the conductor portions 22 and 23) may be arranged asymmetrically about the radiating element 10 as illustrated in FIG. 9. The phases of currents induced in the respective conductor portions that are arranged asymmetrically are different, accordingly, the gain difference increases.

The multiple conductor portions may include conductor portions of different lengths in the polarization direction (the Z axis direction) of the radiating element 10 as illustrated in FIG. 9. Due to the difference in the lengths in the polarization direction of the radiating element 10, the phases of currents inducted in the respective conductor portions of different lengths are different from one another, and accordingly, the gain difference increases. In the case of FIG. 9, the conductor portions 22 and 23 are of the same length, i.e., a length B, but a length A of the conductor portion 21 is different from the length B of the conductor portions 22 and 23.

When the lengths A and B in the polarization direction of the radiating element 10 are different, the phase of the current inducted in the conductor portion 21 and the phases of the currents inducted in the conductor portions 22 and 23 are different, and therefore, the gain difference increases. In order to increase the gain difference, a ratio A/B is preferably equal to or more than 1.1 and equal to or less than 2.0.

As illustrated in FIG. 9, when multiple conductor portions 21 to 23 are situated along the outer edge of the patch element 10A in a plan view, the gain of the microstrip array antenna 14 improves. Likewise, when multiple conductor portions are situated along the outer edges of the patch elements 10B to 10D in a plan view, the gain of the microstrip array antenna 14 improves. More preferably, the multiple conductor portions are situated along the outer edge extending in the polarization direction of the radiating element (patch element) in order to improve the gain of the microstrip array antenna 14.

In FIG. 9, the radiating element 10 includes multiple antenna elements (in this example, four patch elements 10A to 10D) connected to the single transmission line 12. The multiple conductor portions 21 to 23 are provided for each of the multiple antenna elements. In the example as illustrated in FIG. 9, three conductor portions 21 to 23 are provided for the single patch element 10A, three conductor portions 21 to 23 are provided for the single patch element 10B, three conductor portions 21 to 23 are provided for the single patch element 10C, and three conductor portions 21 to 23 are provided for the single patch element 10D. For a single antenna element, a single conductor portion may be provided, or multiple conductor portions may be provided. However, when multiple conductor portions are provided, the phase of the electromagnetic wave radiated from the radiating element 10 can be adjusted to be larger. The multiple antenna elements may have the same number of conductor portions or may have different numbers of conductor portions. A single or multiple conductor portions provided for a single antenna element are provided in proximity to the antenna element.

As illustrated in FIGS. 9 and 10, the antenna unit may include a least one passive element 13 in proximity to at least one conductor portion of the multiple conductor portions. The passive element 13 can change the direction of the main lobe, and the gain difference can be increased. The passive element 13 as illustrated in FIGS. 9 and 10 is provided on the same plane as the radiating element 10 (the patch element 10A), and is provided along the outer edge of the patch element 10A at such a distance that the passive element 13 can be coupled with the patch element 10A and the conductor portions 22 and 23. Passive elements 13 may be provided in proximity to the patch elements 10B and the like in a similar manner. In a plan view, in the arrangement, the passive elements 13 may overlap with at least portions of the multiple conductor portions, or may not overlap therewith as illustrated in FIG. 9. The gain difference can be adjusted by adjusting the positions of the passive elements 13 with respect to the radiating elements 10.

Figure 12:
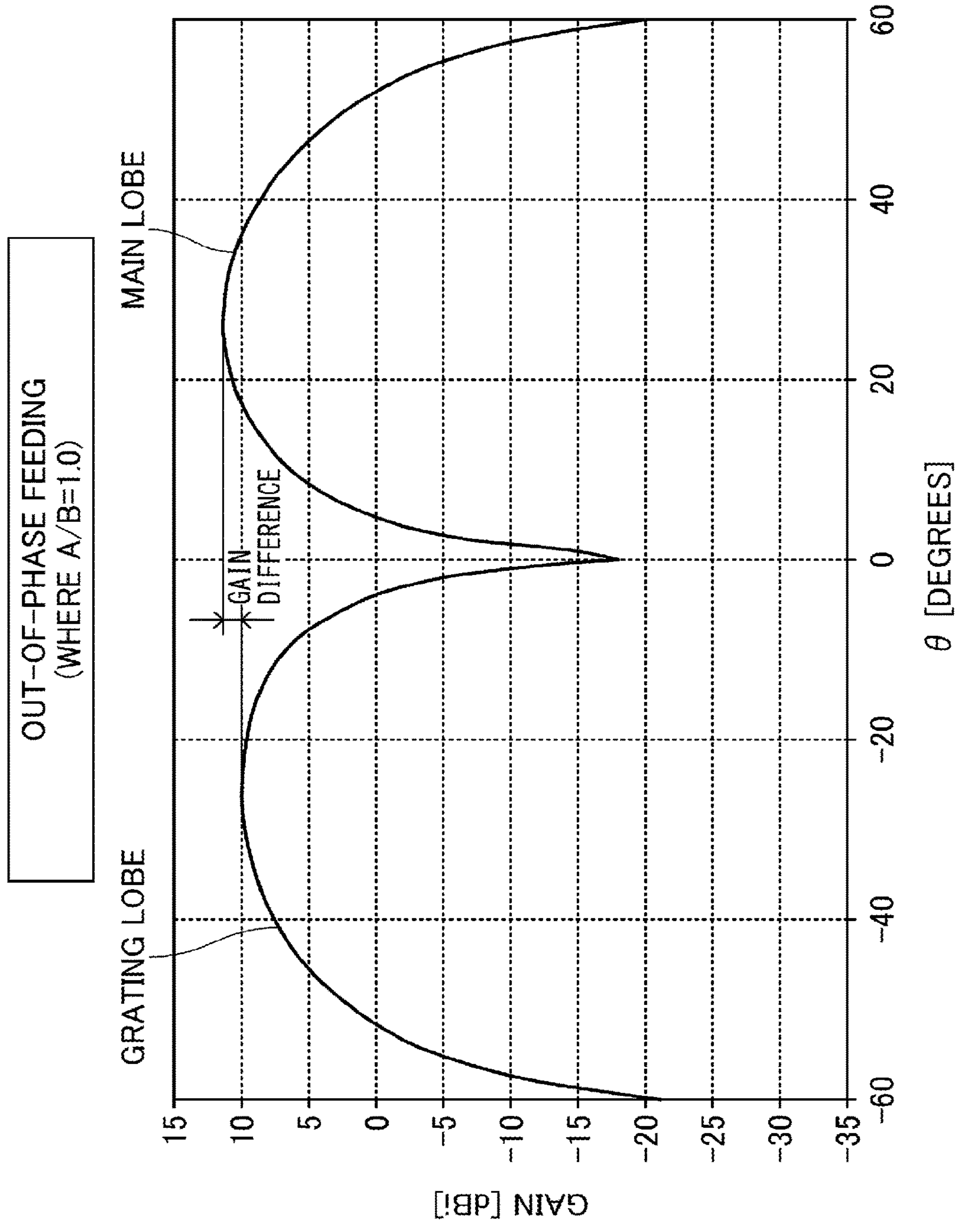
FIG. 12 is a drawing illustrating an example of simulation of a gain difference between a main lobe and a grating lobe obtained with out-of-phase feeding where the ratio A/B was 1.0 in the antenna unit as illustrated in FIG. 9.
Figure 13:
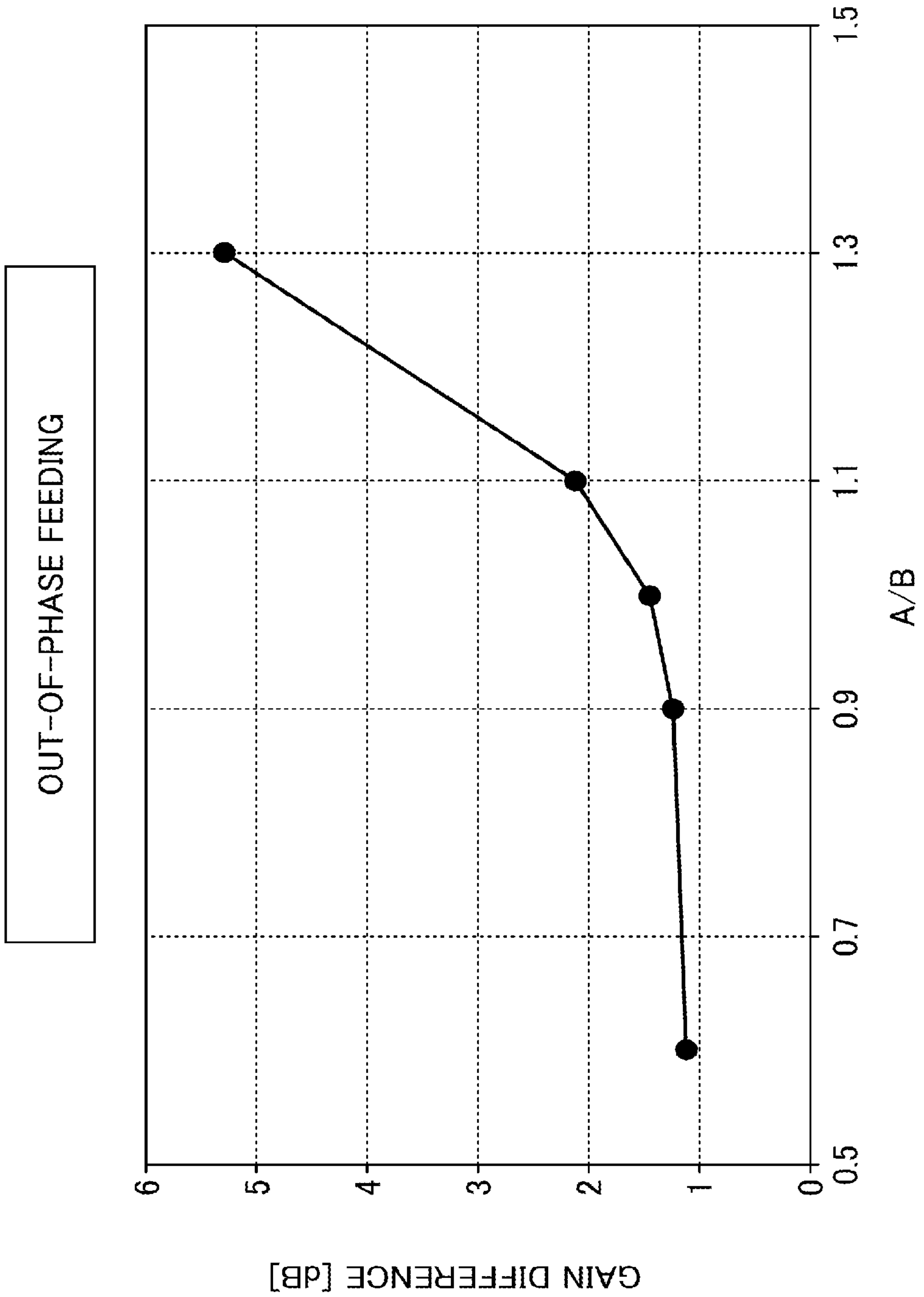
FIG. 13 is a drawing illustrating an example of simulation of a relationship between a gain difference, between a main lobe and a grating lobe, and the ratio A/B obtained with out-of-phase feeding in the antenna unit as illustrated in FIG. 9.

FIG. 12 is a drawing illustrating an example of simulation of a gain difference obtained with out-of-phase feeding where the ratio A/B was 1.0 in the antenna unit as illustrated in FIG. 9. FIG. 13 is a drawing illustrating an example of simulation of a relationship between the gain difference and the ratio A/B obtained with out-of-phase feeding in the antenna unit as illustrated in FIG. 9.

In FIGS. 12 and 13, the antenna unit 1 was installed such that the patch elements 10A and 10C were on the upper side in the vertical direction, and the patch elements 10B and 10D were on the lower side in the vertical direction, and it is assumed that the patch elements 10A and 10C and the patch elements 10B and 10D were fed out-of-phase. In FIG. 12, the horizontal axis denotes an inclination angle θ of the main lobe (the grating lobe) with reference to the horizontal plane. The main lobe represents the gain radiated in the downward direction with reference to the horizontal plane. The grating lobe represents the gain radiated in the upward direction with reference to the horizontal plane.

During the simulation of FIGS. 12 and 13, the simulation conditions such as the dimensions of components as illustrated in FIGS. 9 and 10 were as follows.

A: Variable
B: 22.5 mm (fixed)
L1: 212 mm
L2: 850 mm
L3: 24.5 mm
L4: 55.5 mm
L5: 18.2 mm
L6: 60.0 mm
Thickness of substrate 50: 3.3 mm
Relative permittivity of substrate 50: 4.4
Thickness of dielectric member 41: 1.1 mm
Relative permittivity of dielectric member 41: 4.4
Distance between radiating element 10 and phase control member 80: 7.5 mm
Distance between radiating element 10 and window glass 201: 15 mm As illustrated in FIG. 13, the gain difference improved in accordance with an increase in the ratio A/B, and when the ratio A/B was equal to or more than 0.9, the gain difference increased more greatly.

Figure 14:
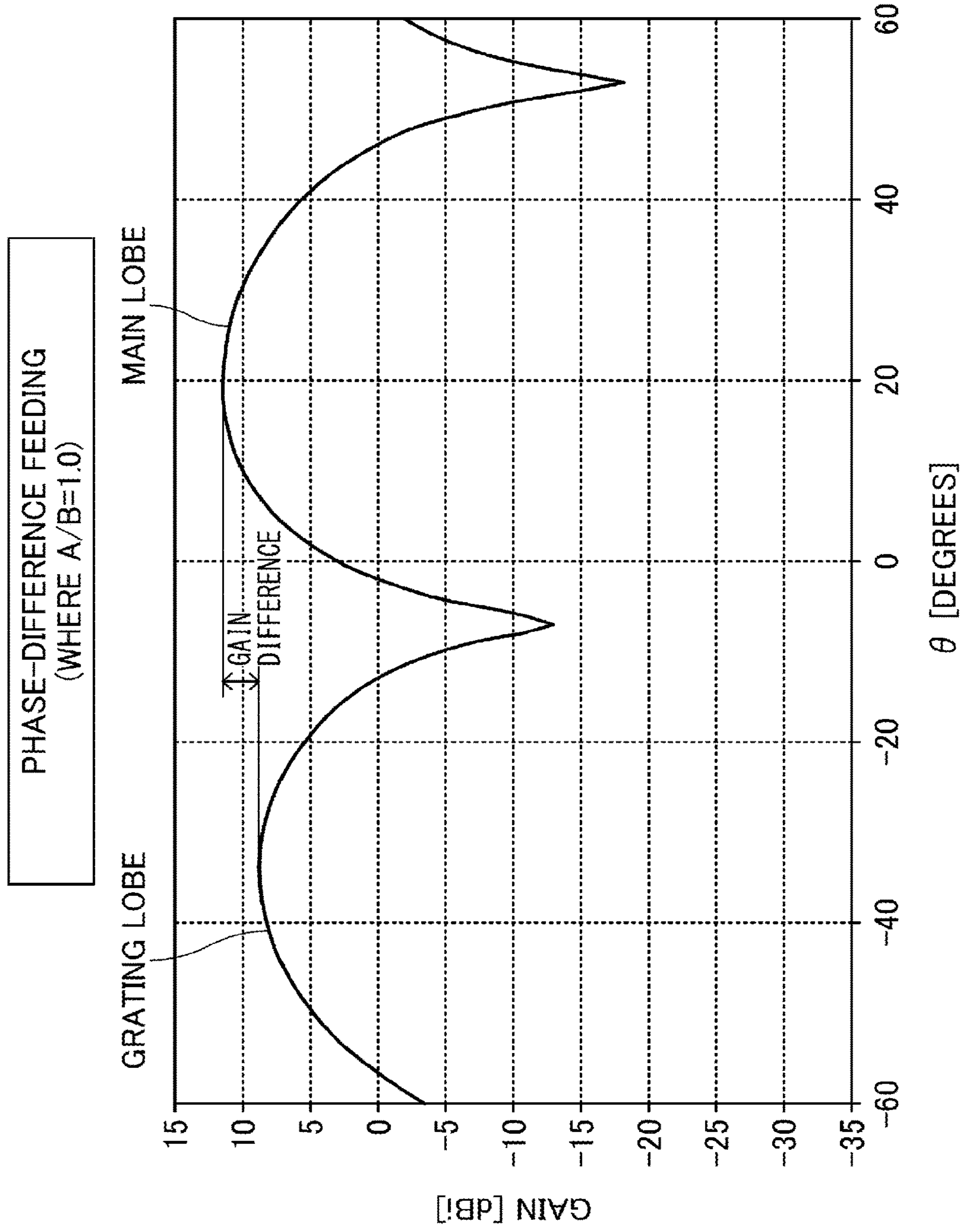
FIG. 14 is a drawing illustrating an example of simulation of a gain difference between a main lobe and a grating lobe obtained with phase difference feeding where the ratio A/B was 1.0 in the antenna unit as illustrated in FIG. 9.
Figure 15:
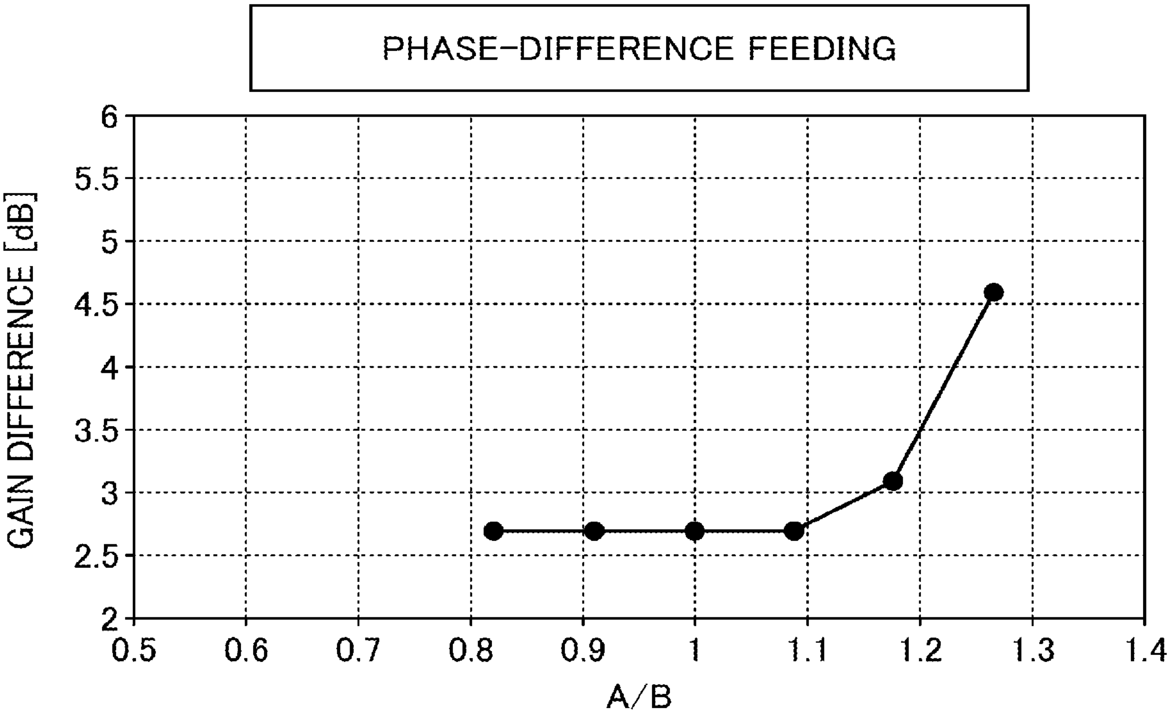
FIG. 15 is a drawing illustrating an example of simulation of a relationship between a gain difference, between a main lobe and a grating lobe, and the ratio A/B obtained with phase difference feeding in the antenna unit as illustrated in FIG. 9.

FIG. 14 is a drawing illustrating an example of simulation of a gain difference obtained with phase difference feeding where the ratio A/B was 1.0 in the antenna unit as illustrated in FIG. 9. FIG. 15 is a drawing illustrating an example of simulation of a relationship between the gain difference and the ratio A/B obtained with phase difference feeding in the antenna unit as illustrated in FIG. 9.

In FIGS. 14 and 15, the antenna unit 1 was installed such that the patch elements 10A and 10C were on the upper side in the vertical direction, and the patch elements 10B and 10D were on the lower side in the vertical direction, and it is assumed that the phases were set so that the inclination angle θ of the main lobe became 20 degrees (the gain was maximized at 20 degrees). The conditions during simulation of FIGS. 14 and 15 were the same as the above-described conditions during the simulation of FIGS. 12 and 13.

As illustrated in FIG. 15, the gain difference improved in accordance with an increase in the ratio A/B, and when the ratio A/B became equal to or more than 1.1, the gain difference increased.

Figure 16:
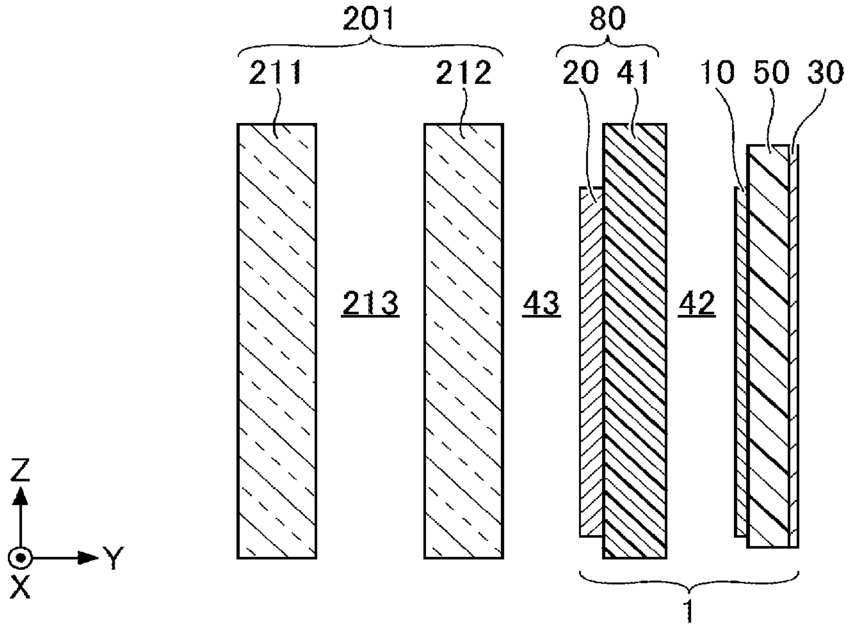
FIG. 16 is a drawing illustrating an antenna unit that faces an insulated window glass.
Figure 17:
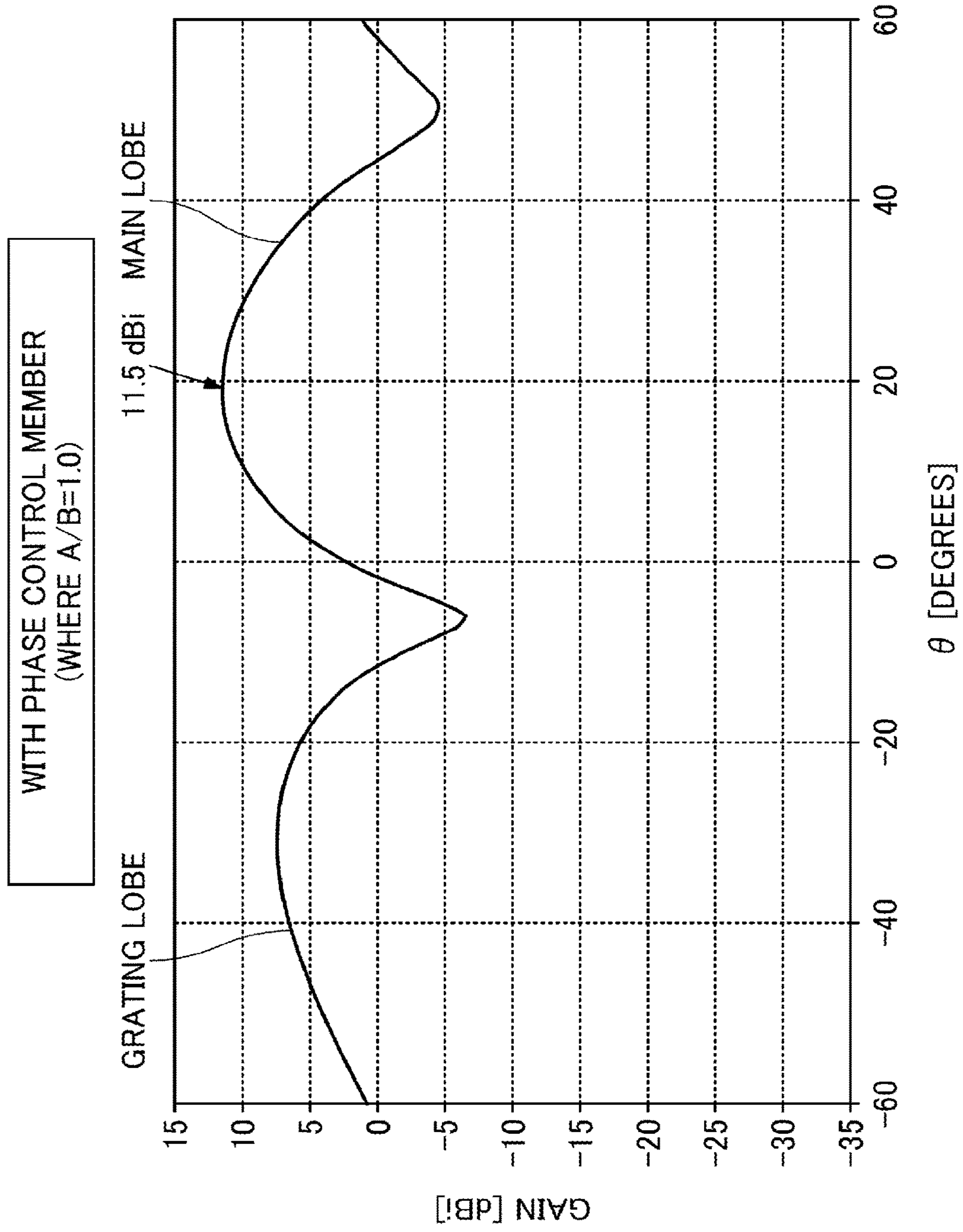
FIG. 17 is a drawing illustrating an example of simulation of a gain obtained with phase difference feeding where the ratio A/B was 1.0 in a case where a phase control member was provided in the antenna unit of FIG. 16.
Figure 18:
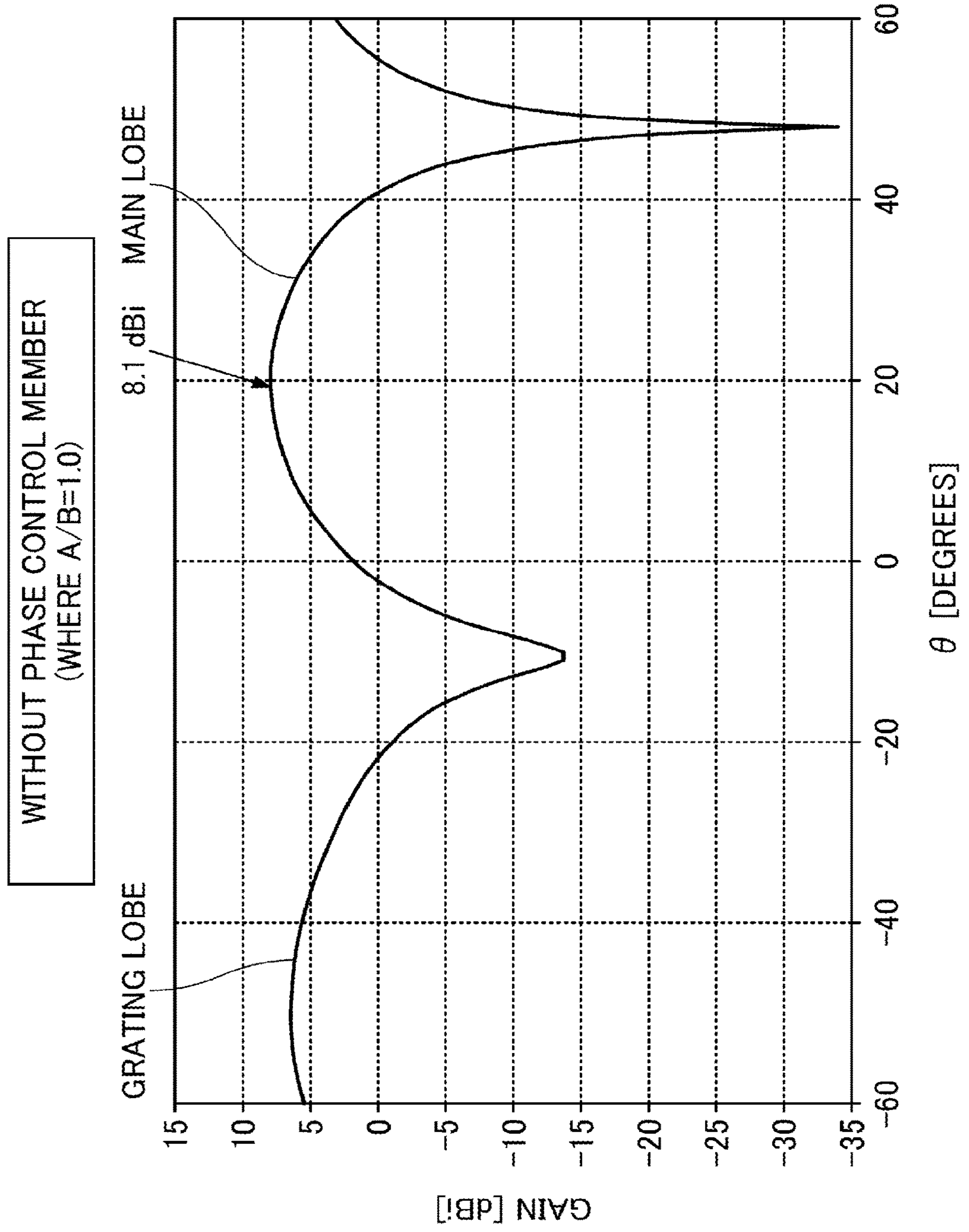
FIG. 18 is a drawing illustrating an example of simulation of a gain obtained with phase difference feeding where the ratio A/B was 1.0 in a case where the phase control member was not provided in the antenna unit of FIG. 16.

FIG. 16 is a drawing illustrating the antenna unit 1 that faces window glass 201 including insulated glass plates 211, 211. FIG. 17 is a drawing illustrating an example of simulation of a gain obtained with phase difference feeding where the ratio A/B was 1.0 in a case where the phase control member 80 was provided in the antenna unit 1 of FIG. 16. FIG. 18 is a drawing illustrating an example of simulation of a gain obtained with phase difference feeding where the ratio A/B was 1.0 in a case where the phase control member 80 was not provided in the antenna unit 1 of FIG. 16.

In FIGS. 17 and 18, the antenna unit 1 was installed as in FIG. 16 such that the patch elements 10A and 10C were on the upper side in the vertical direction, and the patch elements 10B and 10D were on the lower side in the vertical direction, and it is assumed that the phases were set so that the inclination angle θ of the main lobe became 20 degrees (the gain was maximized at 20 degrees).

During the simulation of FIGS. 17 and 18, the conditions were as follows.

Distance between the radiating element 10 and the window glass 201: 15 mm
Thickness of each of the glass plates 211, 212: 4.7 mm
Thickness of an air layer 213 between the glass plate 211 and the glass plate 212: 6.0 mm The remaining conditions were the same as the above-described conditions during the simulation of FIGS. 12 and 13.

In a case where the phase control member 80 was provided (FIG. 17), the gain became 11.5 dBi when the inclination angle θ was 20 degrees, and in a case where the phase control member 80 was not provided (FIG. 18), the gain became 8.1 dBi when the inclination angle θ was 20 degrees. In this manner, when the phase control member 80 was provided, the reflection by the window glass 201 was alleviated.

Although the antenna unit and the window glass have been described above with reference to the embodiments, the present invention is not limited to the above-described embodiments. Various modifications and improvements such as combinations and replacements with some or all of other embodiments can be made within the subject matters of the present invention.

For example, the antenna unit does not have to be fixed to the window glass. The antenna unit may be hung from the ceiling so that the antenna unit is installed and used so as to face the window glass, or the antenna unit can be fixed to a protrusion (for example, a window frame, a window sash, or the like for holding the outer edge of the window glass) that is present around the window glass. The antenna unit may be installed so as to be in contact with the window glass, or may be installed in proximity thereto without being in contact with the window glass.

The phase control member does not have to have multiple conductor portions, and may have only one conductor portion.

What is claimed is:

1. An antenna unit to be used by being installed so as to face window glass for a building, the antenna unit comprising:
   - a radiating element;
   - a phase control member situated on an exterior-side with reference to the radiating element and configured to control a phase of an electromagnetic wave radiated from the radiating element; and
   - a conductor situated on an interior-side with reference to the radiating element,
   - wherein the phase control member is a member including a dielectric, a wave directing member and a plurality of conductor portions,
   - wherein the plurality of conductor portions include conductor portions that are different in shape,
   - wherein the plurality of conductor portions include conductor portions having different lengths in a polarization direction of the radiating element, wherein a distance between the radiating element and the wave directing member is equal to or more than $(2.11\times E_r-1.82)$ mm, where $E_r$ is a relative permittivity of the dielectric, and wherein a gain difference between a main lobe and a grating lobe is equal to or more than 3 dB.

2. The antenna unit according to claim 1, wherein, where the different lengths are denoted as A and B, a ratio A/B is equal to or more than 1.1 and equal to or less than 2.0.

3. The antenna unit according to claim 1, wherein the plurality of conductor portions are on a same plane.

4. The antenna unit according to claim 1, wherein the plurality of conductor portions are not on a same plane.

5. The antenna unit according to claim 1, wherein the radiating element is a patch element.

6. The antenna unit according to claim 5, wherein the plurality of conductor portions are situated along an outer edge of the patch element in a plan view.

7. The antenna unit according to claim 1, wherein the plurality of conductor portions are line-shaped or belt-shaped conductor elements.

8. The antenna unit according to claim 1, wherein the plurality of conductor portions transmit visible light.

9. The antenna unit according to claim 1, further comprising at least one passive element in proximity to at least one conductor portion of the plurality of conductor portions.

10. The antenna unit according to claim 1, wherein the radiating element includes a plurality of antenna elements, and the plurality of conductor portions are provided for the plurality of respective antenna elements.

11. A window glass comprising the antenna unit according to claim 1.

12. The antenna unit according to claim 1, further comprising:

a substrate positioned between the conductor and the radiating element, wherein the radiating element is provided on an exterior side surface of the substrate.

* * * * *